US012700325B2

(12) United States Patent
Karjagi et al.

(10) Patent No.: US 12,700,325 B2
(45) Date of Patent: Aug. 4, 2026

(54) AIRCRAFT TAIL STRIKE DETECTION AND PREVENTION SYSTEM AND METHOD

(71) Applicant: Jeppesen ForeFlight, Inc., Englewood, CO (US)

(72) Inventors: Mallikarjun Karjagi, Bengaluru (IN); Prasad Rao Piradi, Bengaluru (IN); Gurender Singh, Bengaluru (IN); Viniil Dev, Bengaluru (IN)

(73) Assignee: Jeppesen ForeFlight, Inc., Englewood, CO (US)

( * ) Notice: Subject to any disclaimer, the term of this patent is extended or adjusted under 35 U.S.C. 154(b) by 0 days.

(21) Appl. No.: 18/756,842

(22) Filed: Jun. 27, 2024

(65) Prior Publication Data

US 2026/0004668 A1     Jan. 1, 2026

(51) Int. Cl.
| | |
|---|---|
| *G08B 23/00* | (2006.01) |
| *G05D 1/654* | (2024.01) |
| *G08G 5/74* | (2025.01) |
| *G08G 5/80* | (2025.01) |

(52) U.S. Cl.
CPC ............. *G08G 5/80* (2025.01); *G05D 1/6545* (2024.01); *G08G 5/74* (2025.01)

(58) Field of Classification Search
CPC . G08G 5/80; G08G 5/74; G08B 23/00; G08D 1/6545
See application file for complete search history.

(56) References Cited

U.S. PATENT DOCUMENTS

| | | | | |
|---|---|---|---|---|
| 5,901,927 A | * | 5/1999 | Ho | G05D 1/0676 |
| | | | | 340/963 |
| 6,121,899 A | * | 9/2000 | Theriault | G01C 23/00 |
| | | | | 340/967 |

| | | | | |
|---|---|---|---|---|
| 10,043,404 B2 | | 8/2018 | Ell et al. | |
| 2002/0030607 A1 | * | 3/2002 | Conner | G01C 5/005 |
| | | | | 340/967 |
| 2002/0066829 A1 | * | 6/2002 | DeWitt | G05D 1/0653 |
| | | | | 244/181 |
| 2013/0325221 A1 | * | 12/2013 | Shue | G05D 1/0676 |
| | | | | 701/16 |
| 2015/0123821 A1 | * | 5/2015 | Greene | G08G 5/54 |
| | | | | 340/967 |
| 2017/0008642 A1 | * | 1/2017 | Greene | G08G 5/76 |
| 2017/0242444 A1 | * | 8/2017 | Eggold | G05D 1/0676 |
| 2019/0258272 A1 | * | 8/2019 | Huynh | B64C 13/10 |

FOREIGN PATENT DOCUMENTS

| | | |
|---|---|---|
| EP | 1235712 B1 | 1/2007 |
| EP | 3208680 A1 | 8/2017 |

* cited by examiner

*Primary Examiner* — Tan Q Nguyen
(74) *Attorney, Agent, or Firm* — Lathrop GPM LLP

(57) ABSTRACT

One example of an aircraft tail strike detection and prevention system can include one or more processors that obtain one or more aircraft characteristics representative of an aircraft flying toward a landing location and one or more external characteristics representative of one or more conditions outside of the aircraft. The one or more processors can obtain a current descent trajectory that the aircraft is to follow to land at the landing location and calculate a probability that the aircraft will experience a tail strike upon touchdown based on the one or more aircraft characteristics and the one or more external characteristics. The one or more processors can alert a pilot of the aircraft that the aircraft will experience the tail strike upon touchdown based on the probability.

20 Claims, 15 Drawing Sheets

*Case 4*

When unable approach is detected with a Tail Strike then the Tail Strike Prediction detects the Tail Strike and informed to the Flight Crew with a Warning Message.

AIRCRAFT TAIL STRIKE DETECTION AND PREVENTION SYSTEM AND METHOD

FIELD OF THE DISCLOSURE

Examples of the present disclosure generally relate to systems and methods for identifying and optionally avoiding potential aircraft tail strikes.

BACKGROUND OF THE DISCLOSURE

An aircraft tail strike event can occurs when the tail of an aircraft touches the runway or other stationary object during landing. Tail strikes can cause major structural damage to an aircraft, jeopardize the safety of the flight, and lead to high maintenance and repair actions resulting in an increase in operational expense for an airline operator.

Airlines may provide rigorous training and/or flight software simulators to pilots to ensure the pilots have a thorough understanding of the performance characteristics of an aircraft for takeoff and landing phases. Aircraft manufacturers work on improving aircraft design to reduce the risk of tail strikes. This can involve designing aircraft with better aerodynamics and incorporating features like increased tail clearance, revised landing gear design, and advanced flight control systems. Some known flight management software (FMS) systems can compute descent path trajectories and may construct arrival procedures for aircraft, but these FMS systems may not calculate flare angles of the aircraft during touch down along with an optimized descent path trajectory.

But these known systems and approaches may not guarantee a stable approach path. Additionally, complex landing conditions and/or pilot error can still result in tail strikes.

SUMMARY OF THE DISCLOSURE

One example of an aircraft tail strike detection and prevention system can include one or more processors that obtain one or more aircraft characteristics representative of an aircraft flying toward a landing location and one or more external characteristics representative of one or more conditions outside of the aircraft. The one or more processors can obtain a current descent trajectory that the aircraft is to follow to land at the landing location and calculate a probability that the aircraft will experience a tail strike upon touchdown based on the one or more aircraft characteristics and the one or more external characteristics. The one or more processors can alert a pilot of the aircraft that the aircraft will experience the tail strike upon touchdown based on the probability.

One example of an aircraft tail strike prevention method can include obtaining one or more aircraft characteristics representative of an aircraft flying toward a landing location, obtaining one or more external characteristics representative of one or more conditions outside of the aircraft, obtaining a current descent trajectory that the aircraft is to follow to land at the landing location, calculating a probability that the aircraft will experience a tail strike upon touchdown based on the one or more aircraft characteristics and the one or more external characteristics, and alerting a pilot of the aircraft that the aircraft will experience the tail strike upon touchdown based on the probability.

One example of an aircraft tail strike detection and prevention system can include a control unit that can calculate a probability that a tail strike will occur upon touchdown during landing of an aircraft, one or more databases storing one or more of navigation data, obstacle data, engine data, or terrain data, and an output device that can present an alert to a pilot of the aircraft. The control unit can calculate the probability that the tail strike will occur based on a current descent trajectory of the aircraft and based on the one or more of the navigation data, the obstacle data, the engine data, or the terrain data. The control unit can direct the output device to present the alert to the pilot responsive to the probability that the tail strike will occur exceeding a threshold probability.

DETAILED DESCRIPTION OF THE DISCLOSURE

Figure 1:
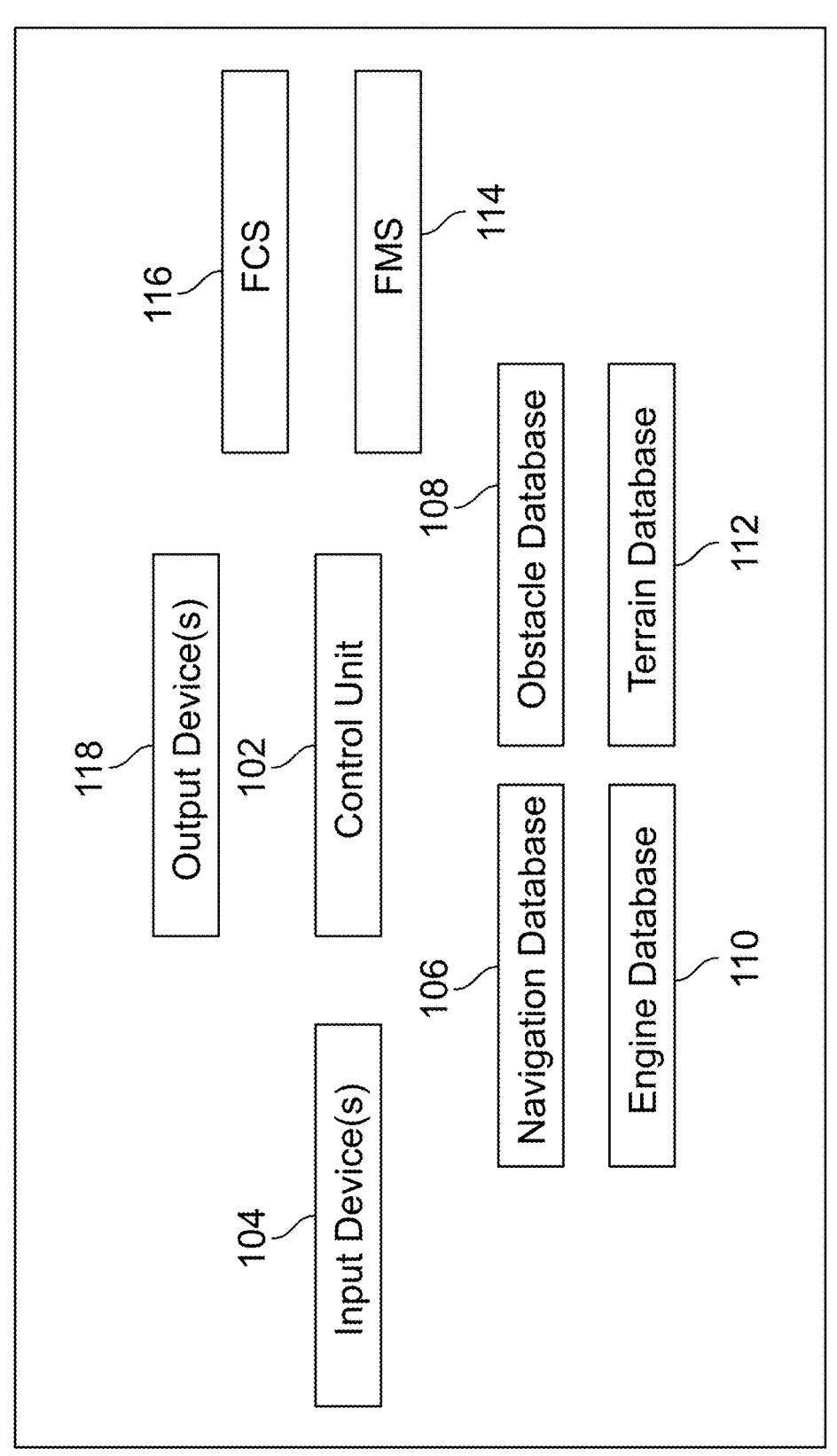
FIG. 1 illustrates one example of an aircraft tail strike detection and prevention system.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. More-over, unless explicitly stated to the contrary, examples "comprising" or "having" an element or a plurality of elements having a particular condition can include addi-tional elements not having that condition.

An aircraft tail strike detection and prevention system and method described herein can detect potential tail strikes, alert the pilots of the potential tail strikes, and optionally control aircraft to prevent tail strikes during the landing phases of flights. The system and method may examine aircraft performance characteristics for different airframe types, weather data, terrain, obstacle data, and constructed optimized descent flight profiles before reaching the final approach fix (FAF) during the landing phase of a flight.

The characteristics that are examined can include landing weight, amount of fuel carried onboard the aircraft (or a weight of the fuel), pitch angle, flare angle (e.g., the pitch angle during descent or landing), flap angles (e.g., the orientation or angles of the flaps on the trailing edges of the wings of the aircraft), weather data, etc. The system and method can use one or more of these characteristics to construct, calculate, or otherwise identify an optimal descent flight trajectory before an initial approach fix (IAF) of the landing of the aircraft. Based on this descent flight trajectory, the system and method can detect whether there is a poten-tial tail strike of the aircraft based on the current (or actual) descent flight trajectory of the aircraft. For example, if the current descent flight trajectory deviates from the calculated descent flight trajectory, the system and method can warn the pilot with an alert. Optionally, the system and method can construct and render the optimized descent flight trajectory on a display to visually guide the pilot to prevent the tail strike.

The optimized descent flight trajectory can be computed based on aircraft characteristics such as altitude, vertical approach speed, pitch rate (e.g., the rate or speed at which the pitch angle changes), pitch attitude, engine thrust, flight path angle, stall speed, angle of attack, sink rate, glide slope, landing weight, and/or flare angle of the aircraft. The flare angle of the aircraft may be the angle between a centerline extending along the length of the aircraft (or fuselage) and the ground. For example, the flare angle may be the pitch angle of the aircraft, such as the angle of rotation of the aircraft about or around an axis that is perpendicular to the longitudinal plane of symmetry of the aircraft. The flare angle may have a positive value while the nose of the aircraft points upward and have a negative value while the nose points downward. The flare angle can be controlled by the pilot or a flight control system (e.g., automatic flight control system) changing the position or orientation of the elevator of the aircraft.

Larger flare angles can result in the aircraft slowing due to increased wind resistance caused by the nose of the aircraft lifting due to the larger flare angle. Smaller flare angles can result in the aircraft not slowing as much (or increasing speed) due to the wind resistance increasing less (or even decreasing) by the nose of the aircraft dropping or not lifting as much due to the smaller flare angle. Other characteristics that may be used to compute the descent flight trajectory can include the condition of a landing location (such as a runway), weather, airspace traffic, etc. The system and method can continue monitoring and com-paring a constructed descent pitch rate of the constructed descent flight trajectory with the existing or actual descent pitch rate of the aircraft. If the actual descent pitch rate of the aircraft deviates from the constructed descent flight trajec-tory by more than a threshold amount (e.g., two degrees or another threshold), then the system and method can generate an alarm or warning to the pilot.

The system and method can compare a computed maxi-mum landing weight of the aircraft (obtained from the FMS system of the aircraft) with the forecasted or constructed descent path trajectory before initiating the descent at a top of the descent of the aircraft. The system and method can assess the potential for a tail strike based on the landing weight and can issue an alert to the pilot.

The system can both detect a potential tail strike and operate to control the aircraft (or guide the pilot) to prevent the tail strike. The system can repeatedly monitor the characteristics to repeatedly determine whether a tail strike is likely to occur and warn the pilot during landing. A flight management computer (FMC) system onboard the aircraft (also referred to as a flight management system, or FMS) can optimize the descent flight profile and approach flight tra-jectory segment by changing various parameters like the pitch attitude, engine thrust, flight path angle, approach speed, stall speed, flare angle, angle of attack, sink rate, pitch attitude, glide slope, runway condition, landing weight, weather, and airspace traffic. The optimized descent flight trajectory can be displayed to the pilot and/or be downlinked or downloaded for post-flight analysis. The optimized descent flight trajectory may be rendered on electronic flight bag applications and/or on flight planning applications.

The system and method can automatically trigger or generate an alert responsive to the system or method deter-mining that the pilot missed engaging the tail strike detec-tion and prevention system within the initial approach segment phase or a threshold altitude above ground level (e.g., five hundred feet or one hundred fifty-two meters). As a result, when the aircraft spoiler is extended, a tail strike can be avoided or prevented when also considering the com-puted pitch attitude and available runway length. If the remaining runway length is insufficient to stop the aircraft, then the system and method can direct the pilot or control the aircraft to initiate a go-around procedure to attempt the landing again.

The system and method may consider weather factors, such as crosswind, headwind, and tailwind presence and speed during approach and landing. These factors can increase the potential of a tail strike. The system and method can align the aircraft with the runway heading and glide path. The system and method may compute the descent flight path by factoring in the descent rate and glide scope angle to counteract impacts of the wind. This can help anticipate a potential tail strike when aircraft descend into turbulent surface layers.

As one example, during landing in a tailwind, the system and method can identify a potential tail strike and generate a warning to the pilot when the aircraft flare is detected. Based on a speed envelope, the system and method can adjust a targeted speed based on the current tail wind, and predict a touch down point of the aircraft and display a calculated aircraft flare angle with the accurate touchdown speed. The pilot can then adjust control of the aircraft to match or follow the displayed flare angle and touchdown speed. Optionally, the system and method can autonomously control the aircraft to follow the calculated flare angle and touchdown speed.

As another example, during an unstable approach of the aircraft toward a runway or while attempting to land in a headwind, the system and method can adjust the targeted aircraft speed based on the current headwind and adjust the flight plan to have stable approach without a tail strike. An un-stabilized approach can be a leading cause of tail strikes. If the aircraft descends beneath a threshold altitude and the aircraft is unstable (e.g., the aircraft is not on a trajectory that will result in the aircraft landing on the centerline of a runway within a designated area), the system and method can alert the pilot and optionally render a go-around procedure for the aircraft to attempt another, more stable landing.

An excessive flare can result in a combination of decreased air speed and a long float, which can increase the pitch of the aircraft and decrease the aircraft tail clearance (thereby increasing the potential for a tail strike). The system and method can repeatedly monitor characteristics of the aircraft before start of the flare phase of landing. If any or at least a threshold possibility or probability for a tail strike is calculated by the system and method, then the system or method can alert the pilot and/or calculate and display a descent flight path that the pilot can control the aircraft to follow. This can reduce or eliminate the possibility for the tail strike.

As another example, during landing in crosswinds, the aircraft may become laterally misaligned with the runway touchdown point, which consequently can increase the risk of a tail strike. The system and method can alert the pilot and repeatedly monitor the potential occurrence of a tail strike under various conditions. If the system or method detects any predicted conditions of speed that might lead to a tail strike (e.g., the speed is faster or slower than an acceptable range, window, or envelope of speeds), the system or method can generate a warning to the pilot specifying the conditions. The system and method can then display an optimized descent flight path on an aircraft display for the pilot to manually control the aircraft to follow (or optionally for the aircraft to be autonomously controlled to follow).

The inventive subject matter described herein can significantly increase the safe operation of aircraft, as well as significantly reduce the cost of repair and maintenance of aircraft, by avoiding or reducing instances of tail strike. The amount of information and the processing speed that is needed to calculate descent trajectories, determine or calculate likelihoods of tail strikes, and modify the descent trajectories to avoid tail strikes while an aircraft is flying and approaching a runway is too much to be performed purely in the human mind or with pen-and-paper. Attempting to manually and repeatedly identify the characteristics described herein, calculate likelihoods of tail strikes based on the characteristics and the descent trajectories, and create other descent trajectories that avoid tail strikes is too complex and is needed to be performed too rapidly due to the aircraft needing to land to allow this to be mentally performed. Additionally, the creation of an alternate descent trajectory that avoids a tail strike is not an activity that is incidental to the overall method or system described herein. The creation of alternate descent trajectories can be a required and necessary activity to avoid tail strikes, increase the safety of the flight, and reduce the cost in maintaining aircraft.

FIG. 1 illustrates one example of an aircraft tail strike detection and prevention system 100. The aircraft tail strike detection and prevention system can be at least partially onboard an aircraft to detect or predict tail strike events and optionally prevent the tail strike events from occurring. As described herein, the tail strike event may be the tail of the aircraft contacting the ground or a stationary object while the aircraft is landing. The aircraft tail strike detection and prevention system includes a control unit 102, which can represent hardware circuitry that includes and/or is connected with one or more processors (e.g., microprocessors, integrated circuits, field programmable gate arrays, controllers, etc.) that perform operations described herein. The control unit 102 may operate according to sets of instructions (e.g., software) to perform the operations described herein. The sets of instructions may be created from, based on, or represent the method(s) described herein.

The control unit 102 can receive information from one or more input devices 104, such as a hard wired network connection, a wireless network connection, a sensor or sensor array, a touchscreen, one or more buttons, keyboards, etc. The control unit 102 can obtain information from one or more computer databases 106, 108, 110, 112, such as a navigation database 106, an obstacle database 108, an engine database 110, and/or a terrain database 112. Optionally, the control unit 102 can obtain information from one or more other databases. The information obtained from the input device(s) 104 and/or the database(s) 106, 108, 110, 112 can be used by the control unit 102 to predict a tail strike event, change the flight plan or path, and optionally control the aircraft to prevent or reduce the likelihood of the tail strike occurring.

The input device(s) 104 can provide information such as the condition of the runway (e.g., whether the surface of the runway smooth or uneven, has a slope or is flat, or is dry, wet, or icy), the weight of the aircraft (e.g., the gross weight of the aircraft and cargo and/or persons onboard), the flight plan (which also or alternatively may be obtained from the navigation database 106 and/or a flight management system 114 ("FMS" in FIG. 1)), weather conditions (e.g., wind speed and/or direction), other aircraft traffic in the area (such as information obtained from an automatic dependent surveillance-broadcast (ADS-B) system), aircraft information (e.g., the airframe type of the aircraft), or the like.

The databases 106, 108, 110, 112 can represent tangible and non-transitory computer readable storage media, such as computer hard drives, removable drives, servers, etc. The navigation database 106 can store navigation data, such as information used by the FMS 114 of the aircraft for navigation and flight planning. This navigation data may include geographical coordinates and properties, such as waypoints in the sky or ground, standard instrument departures (SIDs), standard terminal arrival routes (STARs), airways or paths, flight navigation fixes, airport gate details, predefined routes for aircraft, approach procedures, lengths of different runways, or other records relevant to aircraft navigation. The navigation data may include ARINC 424 records (e.g., fix records, simple route records, complex route records, and/or other records), Jeppesen NAVDATA, or the like.

The FMS 114 can represent hardware circuitry that includes and/or is connected with one or more processors, which may be one or more of the same or different processors than the other processors described herein. The FMS 114 can control route planning for the aircraft, as well as navigation and automation of controlling the aircraft. The FMS 114 may include or represent a flight management computer (FMC), an aircraft navigation system, an electronic flight instrument system, and the like.

The obstacle database 108 may store locations and/or unique identifiers of obstacles. For example, the obstacle database 108 may store a digital obstacle file (DOF), which can store information about man-made obstructions, unique identifiers assigned to the obstructions, accuracy codes associated with the obstacles, and the like. The information may be used to ensure that the flight path of the aircraft is safe from collision with obstacles. The engine database 110 may store information related to the engine(s) of the aircraft. For example, the engine database 110 may store the model of the engine(s), the engine type and/or code of the engine(s), dimensions for aircraft operations, the thrust rating of the aircraft, etc. The terrain database 112 can store information related to terrain and optionally obstacles that can be helpful in planning flights and controlling aircraft during flight. The information stored in the terrain database 112 can include elevation data for several geographic points, obstacle data (man-made structures and natural features, including locations, elevations, obstacle types, etc.).

A flight control system 116 ("FCS" in FIG. 1) can represent hardware circuitry that includes and/or is connected with one or more processors, which may be one or more of the same or different processors than the other processors described herein. The FCS 116 can control the aircraft during flight. The FCS 116 can manipulate control surfaces (e.g., elevators, ailerons, rudder, etc.) to maintain stability, adjust attitude, and execute pilot inputs. The FCS 116 may include an autopilot system that automatically controls the aircraft to maintain a desired or designated flight path (without operator or pilot intervention). For example, the FCS 116 can represent or include an automatic flight control system (AFCS).

One or more output devices 118 can present information to the pilot based on operation of the aircraft tail strike detection and prevention system. The output devices 118 can represent or include the engine indicating and crew alerting system (EICAS), the navigation display (ND) of the aircraft, the primary flight display (PFD), and/or the vertical situational display (VSD) of the aircraft. The output devices 118 can generate alerts, such as information displayed on a display device, an audible sound, a light, or the like, and/or present information on a display device, as described herein.

The aircraft tail strike detection and prevention system may calculate or predict a potential for a tail strike event, which can include calculating a percentage or probability that a tail strike will occur during landing of an aircraft. The aircraft tail strike detection and prevention system may warn the pilot of the potential tail strike and provide a modified flight path to reduce or eliminate the likelihood of the tail strike (if the aircraft is controlled to follow the modified flight path). Optionally, the aircraft tail strike detection and prevention system may automatically control the aircraft to follow the modified flight path to land the aircraft without a tail strike occurring.

Figure 2:
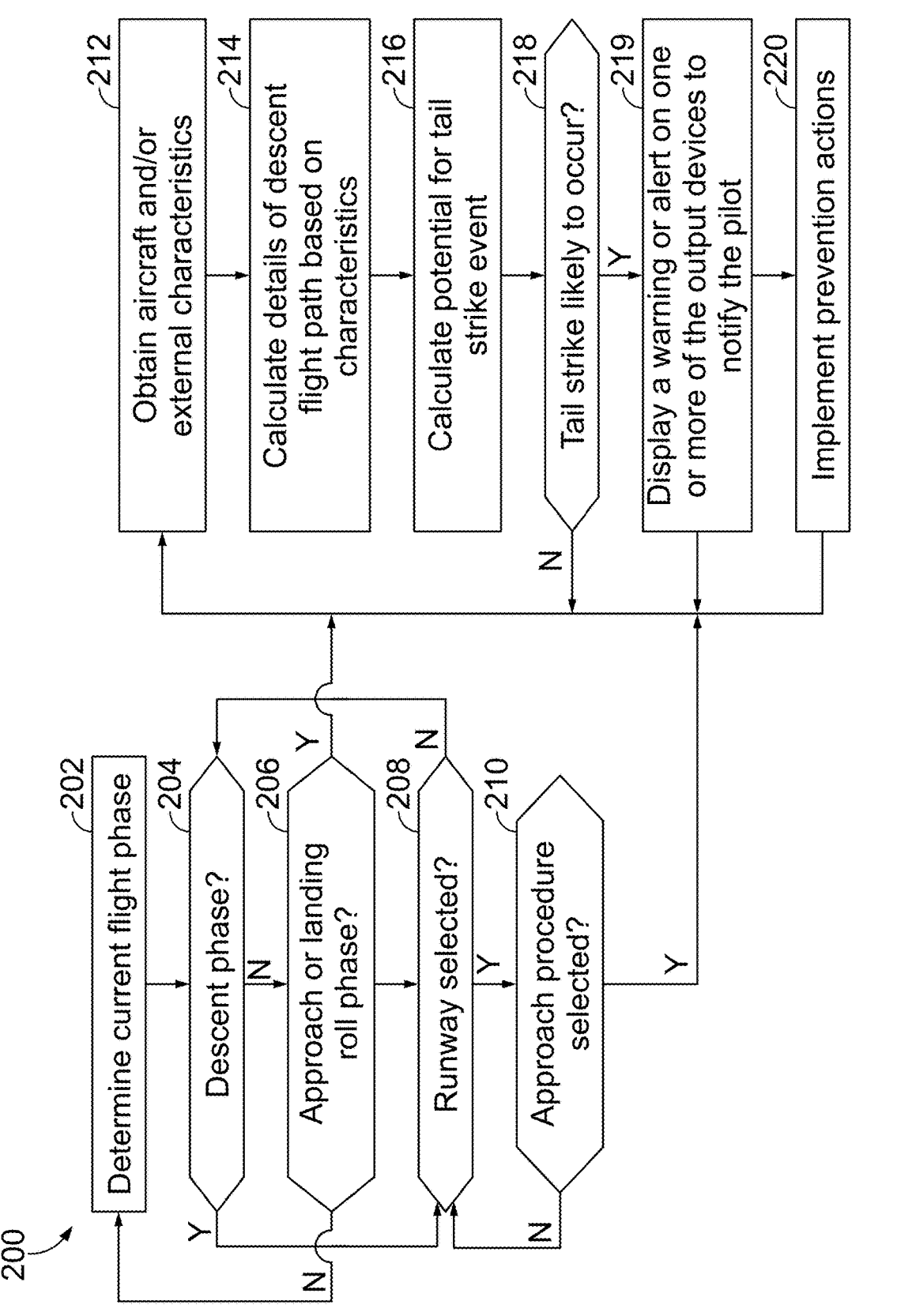
FIG. 2 illustrates a flowchart of one example of a method for detecting upcoming aircraft tail strikes.

FIG. 2 illustrates a flowchart of one example of a method 200 for preventing aircraft tail strikes. The method 200 can represent operations performed by the aircraft tail strike detection and prevention system shown in FIG. 1 and/or other components onboard or off-board the aircraft to reduce or eliminate the likelihood of a tail strike occurring during landing. The method 200 can vary from the order or sequence shown in FIG. 2 and described herein. For example, two or more operations of the method 200 may be performed in a different order, at the same time (concurrently or simultaneously), or in the order shown and described unless expressly and explicitly stated otherwise.

At 202, a current flight phase is determined. The control unit 102 (shown in FIG. 1) can identify the current flight phase based on the location of the aircraft and the planned or designated flight path. The current flight phase may be identified as a descent phase while the aircraft is descending from a cruising altitude toward the landing destination of the aircraft by gradually reducing altitude and planning for the approach and landing of the aircraft. The current flight phase may be identified as the approach phase while the aircraft is preparing for landing. The aircraft may intercept the final approach path, configure the flaps and landing gear for landing, etc. in this flight phase. The current flight phase may be the landing phase or landing roll phase where the aircraft touches down on the runway. In this phase, the aircraft may approach the runway, flare for touchdown on the runway, and optionally reverse thrust to stop on the runway.

At 204 and/or 206, one or more decisions are made as to whether the current flight phase is the descent phase, the approach phase, or the landing roll phase. For example, at 204, the control unit 102 can decide whether the current phase of the flight is the descent phase. If the current phase is the descent phase, then flow of the method 200 can proceed toward 208. But if the current phase is not the descent phase, then flow of the method 200 can proceed to 206. At 206, the control unit 102 can decide whether the current phase is the approach phase or the landing phase. If the current phase is either the approach or landing phase, then flow of the method 200 can proceed toward 212. Otherwise, the current phase of the flight is not the descent phase, the approach phase, or the landing roll phase. The aircraft may not yet be preparing or approaching a landing, so flow of the method 200 can return toward 202. The method 200 can proceed in such a loop-wise manner unless or until the aircraft is in the descent, approach, or landing phase.

At 208, a decision is made as to whether a runway for the aircraft to land on has been selected. The control unit 102 may determine whether the runway has been indicated in the flight plan and/or from input provided by a pilot or other operator. If a runway has been selected for landing, then flow of the method 200 can proceed toward 210. If a runway has not been selected, then the aircraft may not yet be in the approach or landing phase of the flight plan. As a result, flow of the method 200 can return toward 204 and/or 206 to determine whether the aircraft is in the descent, approach, or landing phase.

At 210, a decision is made as to whether an approach procedure (or plan) for the aircraft has been selected. The flight plan may include, or the pilot may input (e.g., select), the approach procedure that includes a sequence of predetermined maneuvers for controlling the aircraft from the approach to landing (or to a location from which a visual landing can be made). If the approach procedure has been selected, then flow of the method 200 can proceed toward 212. But if no approach procedure has been selected, then the aircraft may not be prepared to land and flow of the method 200 can return toward 208.

At 212, characteristics used by the control unit 102 to predict whether a tail strike event is likely to occur and/or to determine an alternate flight path to avoid the tail strike are obtained. These characteristics can include information about the aircraft (e.g., aircraft characteristics) and/or external factors (e.g., external characteristics). The aircraft characteristics can include the gross weight of the aircraft, the flight plan of the aircraft, the pitch attitude of the aircraft, the thrust rating of the aircraft, the approach speed (VAPP) of the aircraft, the stall speed of the aircraft, the flare angle of the aircraft, the angle of attack (AOA) of the aircraft, the sink rate of the aircraft, the glide slope signals received by the aircraft, and the like. The external characteristics can include the runway condition, the length of the runway, weather conditions or data, or the like. These aircraft characteristics and/or external characteristics can be obtained from the databases 106, 108, 110, 112, the input device(s) 104, and/or the FMS 114 shown in FIG. 1, for example.

While the obtaining of characteristics is shown as a single operation in the flowchart of FIG. 2, the characteristics may be repeatedly obtained by the control unit 102. The control unit 102 can repeatedly or continuously obtain one or more of these characteristics during the descent, approach, and/or landing phases to repeatedly or continuously check for whether a tail strike is likely to occur and/or to modify a flight path to reduce or eliminate the possibility of a tail strike occurring.

At 214, details of the descent flight path of the aircraft are calculated based on the characteristics that are obtained. The control unit 102 can calculate the flight path of the aircraft for the landing phase of the aircraft before the aircraft reaches the FAF of the landing phase. Optionally, the FMS 114 can calculate this flight path. The flight path in the landing phase may be calculated using the characteristics to ensure that the aircraft will touch down on the runway in a location that is within a landing envelope or area that allows the aircraft to come to a complete stop within a stopping envelope or area farther down the runway. For example, a heavier aircraft, a runway that is not dry, an aircraft with weaker reverse thrust, a strong tailwind, etc. may cause the descent flight path to be calculated with the aircraft touching down closer to a near end of the runway (and farther from the far end of the runway) to ensure that the aircraft can come to a stop within the stopping envelope. Conversely, a lighter aircraft, a runway that is dry, an aircraft with stronger reverse thrust, a weaker tailwind or a headwind, etc. may cause the descent flight path to be calculated with the aircraft touching down farther from the near end of the runway to ensure that the aircraft comes to a stop within the stopping envelope. The flight path can be calculated to ensure that the aircraft avoids obstacles, accounts for windspeed and/or direction, etc. while stopping within the stopping envelope on the runway.

Many tail strikes during landings occur due to deviations from normal landing techniques such as an un-stabilized approach, bounced landings, excessive approach speed, higher sink rates before the aircraft reaches the flare height, mishandling of the crosswinds, over rotation during go-around, or missed approach operation. The control unit 102 can examine characteristics like the landing weight of the aircraft, the amount of fuel carried by the aircraft, the pitch angle, flare, flap status, weather conditions, runway conditions, etc., and calculate a descent flight trajectory before IAF.

At 216, a potential for a tail strike event is calculated. This potential may be calculated as a probability that a tail strike will occur given the current descent flight trajectory of the aircraft. Optionally, this potential may be calculated as a binary result, with one of the binary results indicating that a tail strike is likely to occur or will occur, and the other binary result indicating that a tail strike is unlikely to occur or will not occur. The potential for a tail strike event may increase for certain airframes (e.g., longer aircraft, aircraft with lower ground clearances, shorter distances of the main landing gear from the aircraft tail, etc.), faster rates of descent of the aircraft, steeper paths of descent of the aircraft, heavier aircraft, more uneven runways, or the like. The potential for the tail strike event may decrease for other airframes (e.g., shorter aircraft, aircraft with higher ground clearances, longer distances between the main landing gear and the tail, etc.), slower rates of descent, shallower paths of descent, lighter aircraft, smoother runways, etc.

In one example, the control unit 102 may use a mathematical model to calculate the potential for the tail strike. This model may receive values associated with the aircraft characteristics and/or the external characteristics as input. The values may change for different characteristics, with increasing values assigned to characteristics that increase the likelihood of a tail strike and decreasing values assigned to characteristics that decrease the likelihood of a tail strike. Weights may be applied to the characteristic values (e.g., by multiplying the characteristic values by the weights). Larger weights may be applied to some characteristics to increase the importance of those characteristics in calculating the probability of the tail strike occurring, while lesser weights may be applied to other characteristics to decrease the importance of those characteristics in calculating the probability of the tail strike occurring. The model may combine these values and optional weights in one or more mathematical equations to output a probability or likelihood that a tail strike will occur. In one example, empirical evidence of the characteristics associated with prior landings of different aircraft where (a) tail strikes occurred and (b) tail strikes did not occur may be used to determine the values to be assigned to various characteristics and/or the weight to be applied to certain values. The values and weights may be adjusted until the model outputs greater probabilities when using the characteristics associated with prior landings having tail strikes and the model outputs lesser probabilities when using the characteristics associated with prior landings not having tail strikes.

At 218, a decision is made as to whether a tail strike is likely to occur. The control unit 102 can examine the probability calculated at 216 and determine whether the probability exceeds a designated threshold probability. This threshold probability can be associated with or derived from prior landings where tail strikes did and did not occur. For example, the empirical evidence used to determine the values to be assigned to various characteristics and/or the weights to be applied to certain values also can be used to calculate the threshold probability. Once the probabilities of tail strikes associated with prior known landings are calculated, the value of the threshold probability can be set so that those prior landings with tail strikes have calculated probabilities that meet or exceed the threshold probability, while other prior landings with no tail strikes have calculated probabilities that do not meet or exceed the threshold probability. Optionally, if the potential is calculated as a binary yes (a tail strike will occur) or no (a tail strike will not occur), then the control unit 102 can use this potential as the determining factor at 218.

If the tail strike is likely to occur, then flow of the method 200 can proceed from 218 toward 219. At 219, a warning or alert can be presented to the pilot of the aircraft via one or more of the output device(s) 118. One example of such a warning or alert is shown at 308 in FIG. 4, described below. But if the tail strike is not likely to occur, then flow of the method 200 can return toward 212 from 218. This can allow the method 200 and the system 100 to repeatedly examine the characteristics and the current descent path of the aircraft to determine whether a tail strike is likely to occur. Once the aircraft lands, the method 200 can terminate.

At 220, one or more prevention or preventive actions can be implemented. These actions that may be taken or implemented are shown and described in connection with the flowchart shown in FIG. 3. One action that may be implemented is to warn the pilot of the potential tail strike, such as by the control unit 102 generating a warning or alert on one or more of the output devices 118 (shown in FIG. 1) to notify the pilot or others of the likely tail strike. The control unit 102 may prompt the pilot with an alert on the EICAS, the ND, and/or the PFD. One example of such an alert is shown in FIG. 4.

Figure 4:
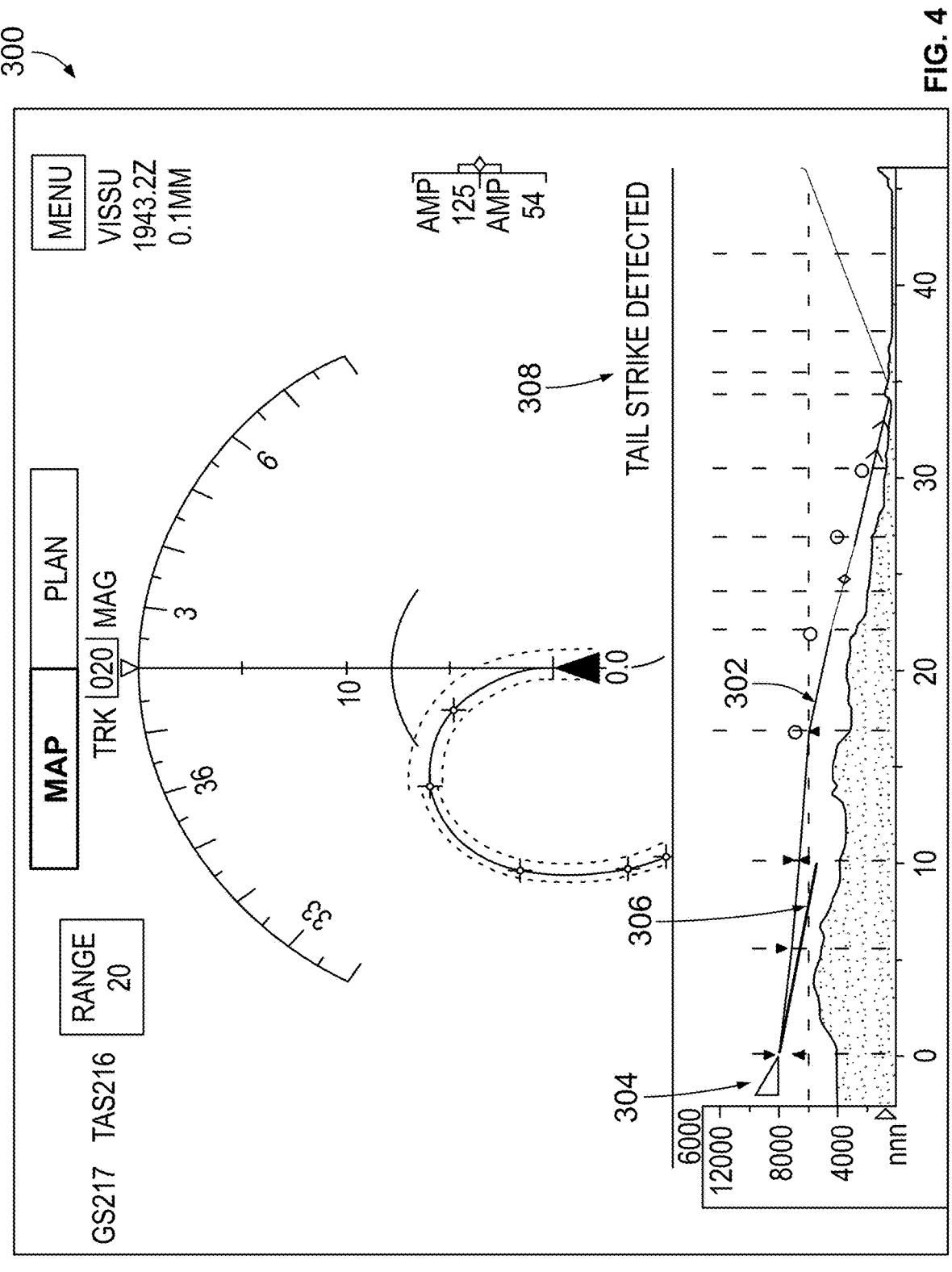
FIG. 4 illustrates one example of an output that may be generated on output device(s) shown in FIG. 1 to alert the pilot of a potential or likely tail strike.

FIG. 4 illustrates one example of an output 300 that may be generated on the output device(s) 118 (shown in FIG. 1) to alert the pilot of a potential or likely tail strike. The output 300 may be displayed on the ND of the aircraft. As shown, the output 300 includes a planned or designated descent flight path 302 for the aircraft (represented by an icon 304), as well as an actual descent flight path 306 of the aircraft. As shown, the actual descent is steeper than the planned descent, thereby resulting in the control unit 102 determining that a tail strike is likely to occur. As described above, this determination may involve the examination of several characteristics and not just the angle of attack. The control unit 102 can direct the output 300 to include alert indicia 308, such as text, symbols, numbers, or a combination thereof to notify the pilot or another operator that a likely tail strike event is detected.

Figure 3:
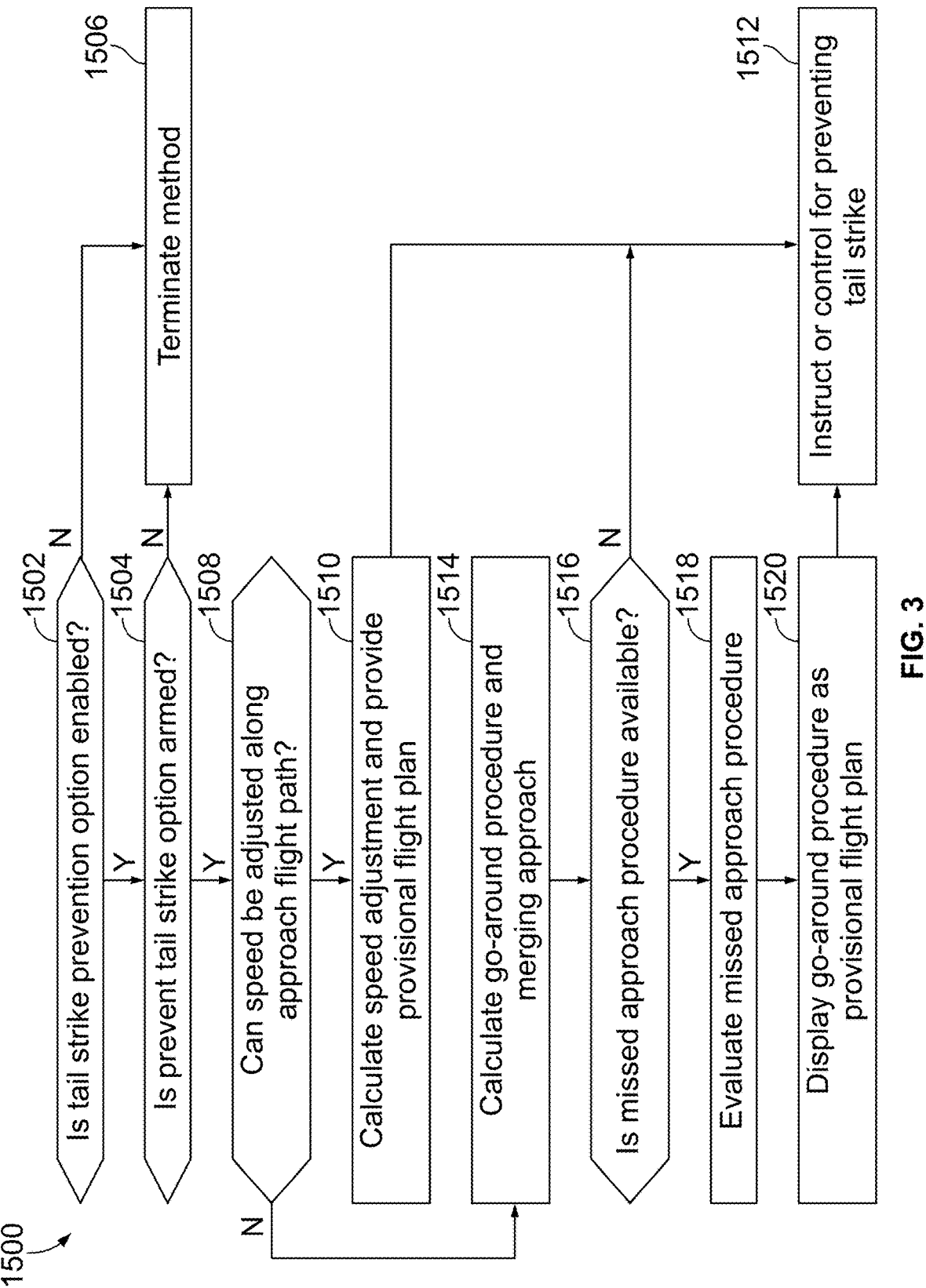
FIG. 3 illustrates a flowchart of one example of a method for preventing aircraft tail strikes.

FIG. 3 illustrates a flowchart of one example of a method 1500 for preventing an aircraft tail strike. The operations shown and described in connection with the method 1500 can represent the operations performed at 220 or in connection with 220 in the method 200 shown in FIG. 2.

At 1502, a decision is made as to whether a tail strike prevention option is or has been enabled in the aircraft. For example, the pilot can select this option as displayed on the ND of the aircraft. If the option is selected or enabled, then flow of the method 1500 can proceed toward 1504. Otherwise, flow of the method 1500 can proceed toward 1506, where the method 1500 may terminate.

At 1504, a decision is made as to whether a tail strike prevention option is armed or activated in the aircraft. For example, a control display unit onboard the aircraft can be one of the output device(s) 118, and may display an option to arm or disarm this prevention option. If the option is selected or otherwise armed, flow of the method 1500 can proceed toward 1508. Otherwise, flow of the method 1500 can proceed toward 1506, where the method 1500 may terminate.

At 1508, a decision is made as to whether the aircraft speed can be adjusted along the approach flight path. For example, the control unit 102 can examine the aircraft speed, along with other factors such as the windspeed and direction, the angle of attack, and other characteristics described herein. If the control unit 102 determines that the aircraft speed can be adjusted along the current approach flight path and avoid the tail strike predicted (as described in the method 200 shown in FIG. 2), then flow of the method 1500 can proceed toward 1510. Otherwise, if the speed cannot be adjusted along the current approach flight path to avoid the tail strike, then flow of the method 1500 can proceed toward 1514.

At 1510, a speed adjustment and/or provisional flight plan are calculated. The control unit 102 can calculate the speed adjustment and/or change to the flight plan that will avoid the predicted tail strike. At 1512, instructions may be provided to the pilot and/or the aircraft may be automatically controlled to fly according to the speed adjustment and/or provisional flight plan calculated at 1510. For example, the control unit 102 can provide instructions to the pilot that instructs the pilot how to control the aircraft to prevent the tail strike or the aircraft is automatically controlled to avoid the tail strike using the FCS 116.

Figure 5:
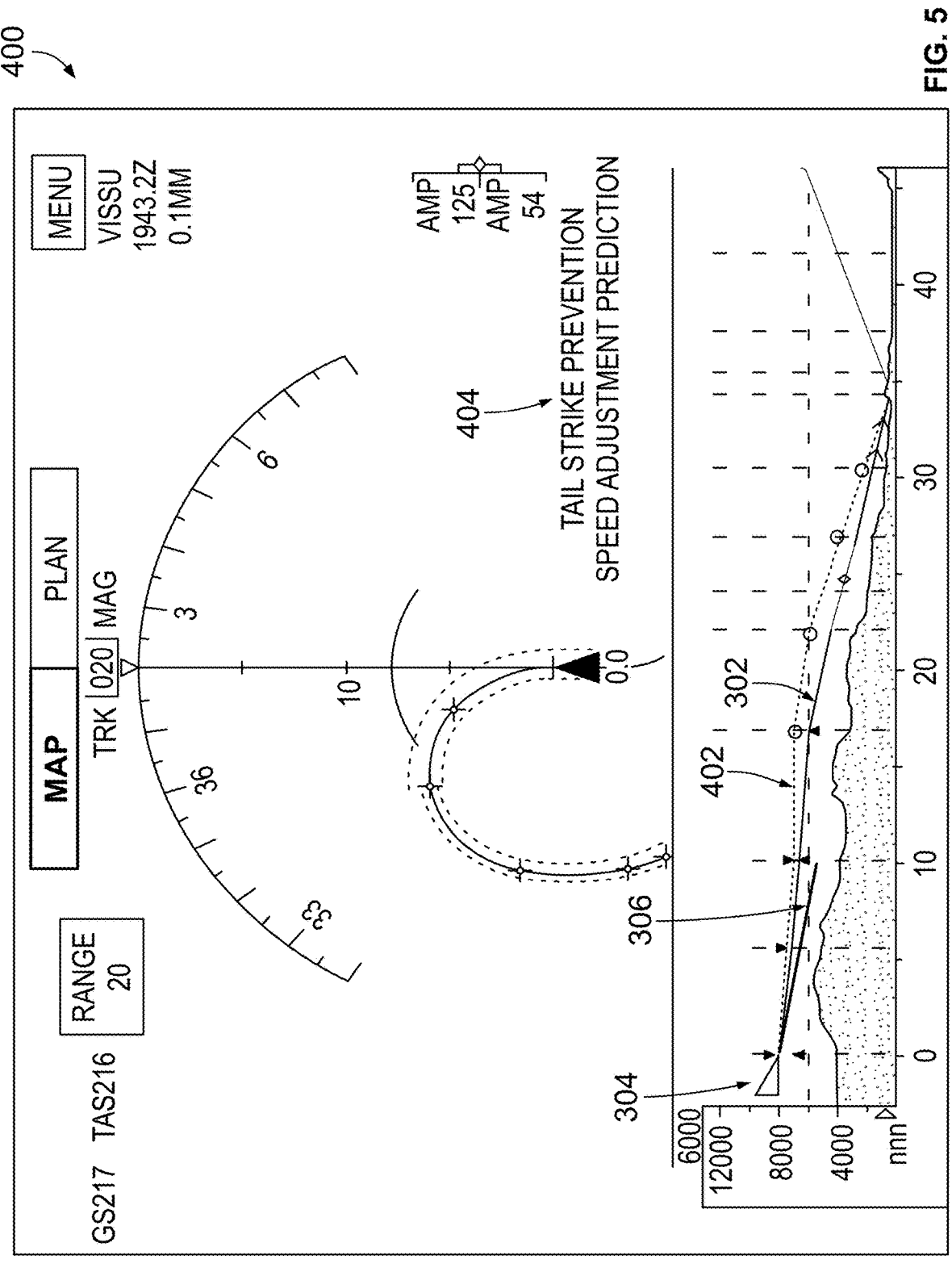
FIG. 5 illustrates another example of an output that may be generated on the output device(s) to notify the pilot of the descent trajectory or path that is calculated to avoid a tail strike.
Figure 15:
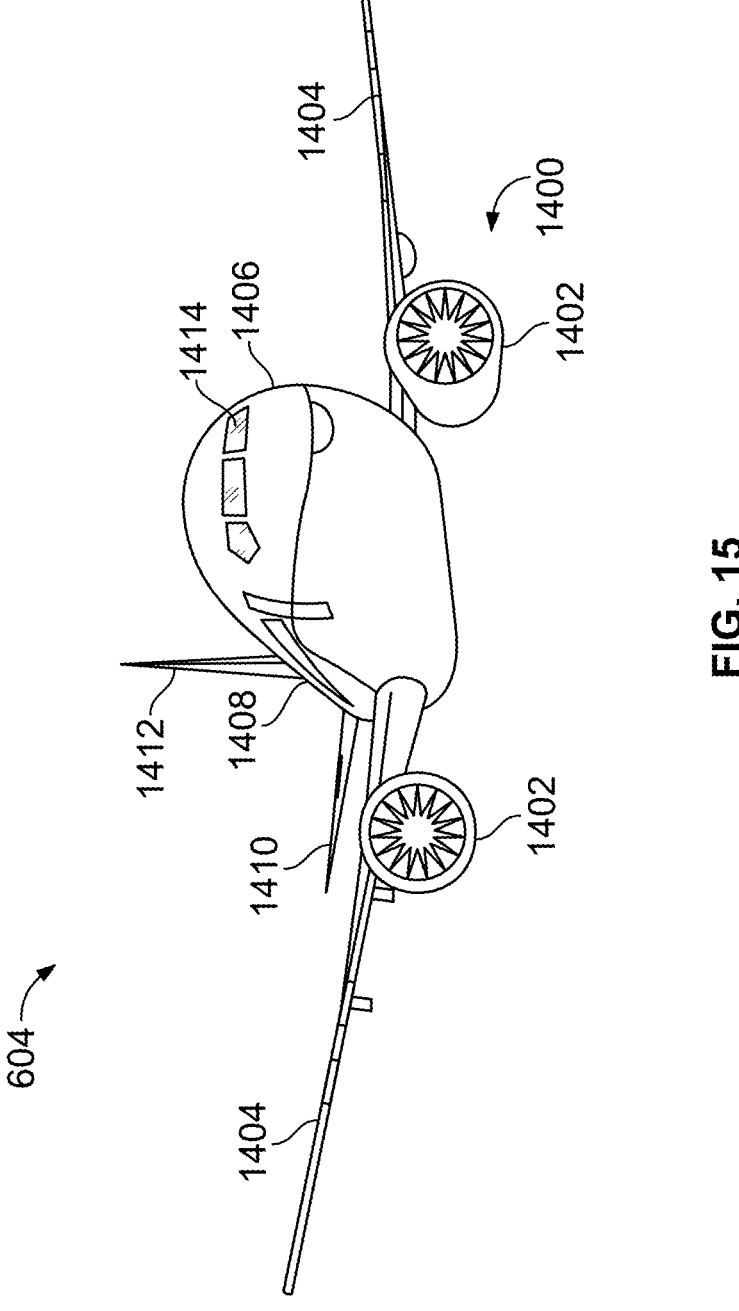
FIG. 15 illustrates a perspective front view of the aircraft according to one example.

With continued reference to the method 1500 shown in FIG. 15, FIG. 5 illustrates another example of an output 400 that may be generated on the output device(s) 118 (shown in FIG. 1) to notify the pilot of the change in aircraft speed that is calculated to avoid a tail strike. This output 400 can represent the speed adjustment and/or provisional flight plan created at 1512. The output 400 may be displayed on the ND of the aircraft. As shown, the output 400 includes the previously planned or designated descent flight path 302, as well as the actual descent flight path 306 of the aircraft. The control unit 102 can direct the output device(s) 118 to also display adjustments to aircraft speed that result in a calculated descent trajectory or path 402.

The control unit 102 can calculate a trajectory or path for the aircraft and/or a change in speed for the aircraft that reduces or eliminates the likelihood of the tail strike occurring (e.g., at 1510). The calculated descent trajectory may be computed based on altitude, vertical approach speed of an aircraft, pitch rate, flare angle, etc., of the aircraft. The control unit 102 can examine different trajectories and calculate the likelihoods of tail strike events for the different trajectories that are examined. The control unit 102 can select the trajectory that is associated with the lowest likelihood of a tail strike or can select another trajectory associated with a tail strike likelihood that does not meet or exceed the threshold probability. The trajectory that is selected or calculated may be referred to as a calculated descent trajectory or path, an optimum descent trajectory or path, a revised descent trajectory or path, or the like. The term "optimum" does not necessarily mean that the trajectory or path optimizes every characteristic or factor described herein to the greatest or smallest preferable value, as appropriate, but means that the trajectory or path is changed to reduce or eliminate the probability of a tail strike occurring.

Optionally, the change in aircraft speed resulting in the calculated descent trajectory can be displayed on the VSD and may be downlinked or downloaded through ADS-C for air navigation service provider's (ANSPs) future reference for post flight analysis. The calculated descent flight trajectory can be rendered on the Jeppesen's EFB (ELECTRONIC FLIGHT BAG) applications like FLIGHT DECK PRO or on planning applications based on augmented reality, virtual reality, or mixed reality devices (like APPLE VISION PRO, MICROSOFT HOLOLENS 2, META QUEST PRO, etc.).

As shown, the calculated descent trajectory 402 differs from the actual descent trajectory 306 and the previously planned descent trajectory 302 due to the change in aircraft speed. The calculated descent trajectory 402 may be calculated to reduce or eliminate the likelihood of the tail strike occurring. Presenting the calculated descent trajectory 402 to the pilot can direct and guide the pilot to control the aircraft to safely land without a tail strike. The control unit 102 optionally can direct the output device(s) 118 to present informative indicia 404 that notifies the pilot that the new or calculated descent trajectory 402 is calculated to prevent the tail strike. Optionally, the FCS 116 (shown in FIG. 1) of the aircraft can automatically control the aircraft to follow the calculated descent trajectory 402. For example, the FCS 116 can automatically control the movement of the aircraft to follow the calculated descent trajectory 402. Providing the calculated descent trajectory 402 and/or automatically controlling the aircraft to follow the calculated descent trajectory 402 can help ensure that the aircraft can safely land without a tail strike occurring.

Returning to the description of the method 1500 shown in FIG. 15, following instructing the pilot and/or automatically controlling the aircraft at 1512, the method 1500 may terminate or may return to one or more other operations, such as 1502. For example, the detection and prevention system 100 may continue to monitor flight of the aircraft on approach to ensure that a tail strike continues to be avoided.

If it is decided (e.g., by the control unit 102) that the speed of the aircraft cannot be adjusted along the approaching flight path at 1508, flow of the method 1500 can proceed toward 1514. At 1514, a go-around procedure and merging approach for the aircraft can be calculated. The control unit 102 can calculate a go-around procedure that causes the aircraft to bypass landing on the current approach and make another attempt to land without a tail strike. The control unit 102 can calculate where the aircraft is to turn around and fly to attempt the landing without the tail strike.

At 1516, a decision is made as to whether a missed approach procedure is available. For example, the control unit 102 can determine whether the missed approach procedure for the aircraft is available to the aircraft based on whether the aircraft achieved the required altitude before reaching the missed approach point of the flight plan. If the missed approach procedure is available, then flow of the method 1500 can proceed toward 1518.

If the missed approach procedure is not available, then flow of the method 1500 can proceed toward 1512. At 1512, the go-around procedure and merging approach that was calculated (e.g., at 1514) may be used to instruct the pilot and/or to automatically control the aircraft to fly according to this procedure and approach. For example, the control unit 102 can display the go-around procedure on the output device(s) 118 and/or send a signal to the FCS 116 to automatically control the aircraft according to this procedure and approach.

Figure 6:
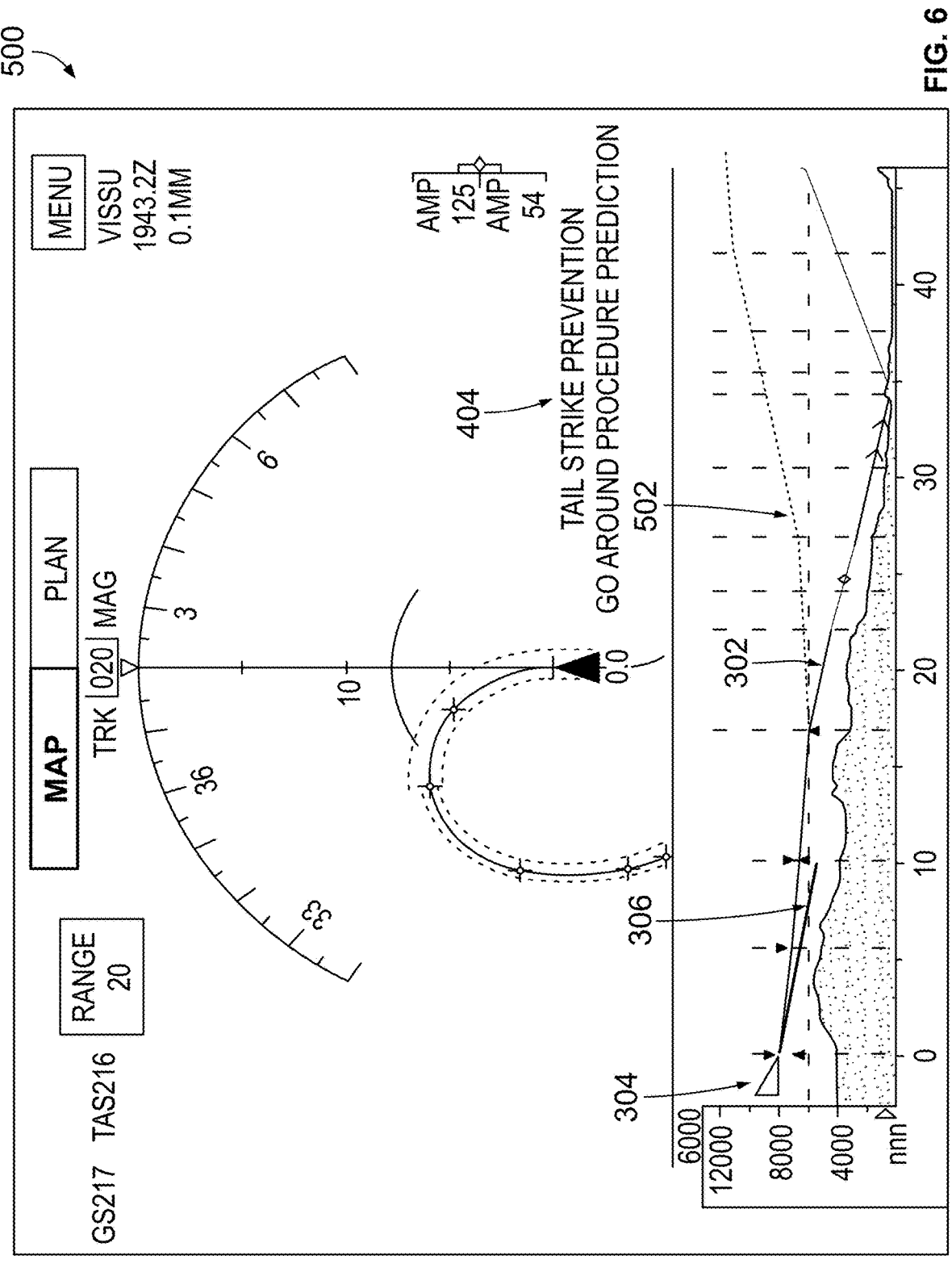
FIG. 6 illustrates another example of an output that may be generated on the output device(s) to notify the pilot to initiate a go-around procedure to avoid a tail strike.

With continued reference to the flowchart of the method 1500 shown in FIG. 3, FIG. 6 illustrates another example of an output 500 that may be generated on the output device(s) 118 (shown in FIG. 1) to notify the pilot to initiate a go-around procedure to avoid a tail strike. The output 500 may be displayed on the ND of the aircraft. As shown, the output 500 includes the previously planned or designated descent flight path 302, as well as the actual descent flight path 306 of the aircraft. The control unit 102 can direct the output device(s) 118 to also display a calculated go-around trajectory or path 502 that is calculated by the control unit 102 responsive to determining that the aircraft needs to circle back around and attempt the landing again.

In one example, the aircraft tail strike detection and prevention system may operate in a tail strike detection mode and a tail strike avoidance mode. The detection mode can involve the operations described herein that are used to detect an upcoming tail strike (or calculate the likelihood of one occurring). The avoidance mode can involve the operations described herein that are used to guide the pilot or automatically control the aircraft to avoid a tail strike. Once the avoidance mode is selected (either manually or automatically, such as in response to the aircraft coming within a designated distance of a runway), the FMS 114 (shown in FIG. 1) can continue monitoring the current, active flight path. If the pilot misses to engage the avoidance mode within a threshold distance of the runway (e.g., within an initial approach segment phase or five hundred feet (e.g., one hundred fifty-two meters) above the ground level where the approach variables and approach speed are not stabilized within the final approach fix, then the control unit 102 can trigger or generate an alert via the output device(s) 118. This alert can notify the pilot to control the descent rate so that a tail strike is avoided when the spoiler is extended, and the aircraft is controlled to travel along the computed pitch attitude of the computed descent trajectory.

Returning to the description of the flowchart of the method 1500 shown in FIG. 3, if it is decided at 1516 that the missed approach procedure is available, then flow of the method 1500 can proceed from 1516 toward 1518. At 1518, the missed approach procedure is evaluated. For example, the control unit 102 can examine this approach procedure and calculate whether a tail strike is predicted to occur if the approach procedure is followed. At 1520, the go-around procedure is presented to the pilot as a provisional flight plan. The control unit 102 can direct the output device(s) 118 to display the go-around procedure to the pilot. At 1512, the pilot is instructed to follow the go-around procedure or the missed approach procedure and/or the aircraft is automatically controlled to follow the go-around procedure or the missed approach procedure, as described above. Flow of the method 1500 may then terminate or return to one or more other operations, such as 1502.

Returning to the description of the flowchart shown in FIG. 2, flow of the method 200 can return from 220 to 212 or 214. This can allow the control unit 102 to continue monitoring and comparing the calculated descent trajectory with the current or actual descent trajectory. If the current or actual trajectory differs from the calculated trajectory (e.g., by more than a threshold amount), then the control unit 102 can direct the output device(s) 118 to generate an additional alert to the pilot and/or the control unit 102 can calculate another descent trajectory 402. For example, the control unit 102 can continue monitoring the descent pitch rate of the aircraft and comparing the descent pitch rate with the pitch rate of the calculated trajectory. If these pitch rates differ (e.g., by more than two degrees), then an alert can be generated and/or the calculated trajectory may be revised. In this monitoring, the control unit 102 can compare a computed maximum landing weight (MLW) from the FMS 114 with the calculated descent trajectory before initiating descent at the top of descent (TOD) location.

The control unit 102 can continue monitoring other characteristics, such as the pitch attitude, engine thrust, flight path angle, approach speed, stall speed, flare angle, angle of attack, sink rate, pitch attitude, glide slope, runway condition, landing weight, weather conditions, airspace traffic, etc. to repeatedly determine whether a tail strike is likely to occur during landing.

If the control unit 102 determines (at 220) that no calculated descent trajectory will prevent or avoid a tail strike or that there is insufficient runway to stop the aircraft within the stopping envelope, then the control unit 102 may direct the pilot or automatically control the aircraft to not land and circle back around to attempt the landing again. This can be referred to as a go-around procedure. For example, the control unit 102 may determine that all calculated descent trajectories have a likelihood of a tail strike that meets or exceeds the threshold probability (or that the calculated descent trajectories that do have such a low probability would not result in the aircraft stopping withing the stopping envelope on the runway). The control unit 102 can then direct the pilot or automatically control the aircraft to bypass the runway, turn around, and attempt the landing again.

The operations of the methods 200, 1500 can be performed before the aircraft reaches the top of the descent phase of the flight plan or path. For example, the control unit 102 can determine the current flight phase, obtain the characteristics, calculate details of the descent flight path based on the characteristics, calculate the potential for a tail strike, determine whether the tail strike is likely to occur, and provide the warning if a tail strike is likely to occur before the aircraft begins the descent phase.

Figure 7:
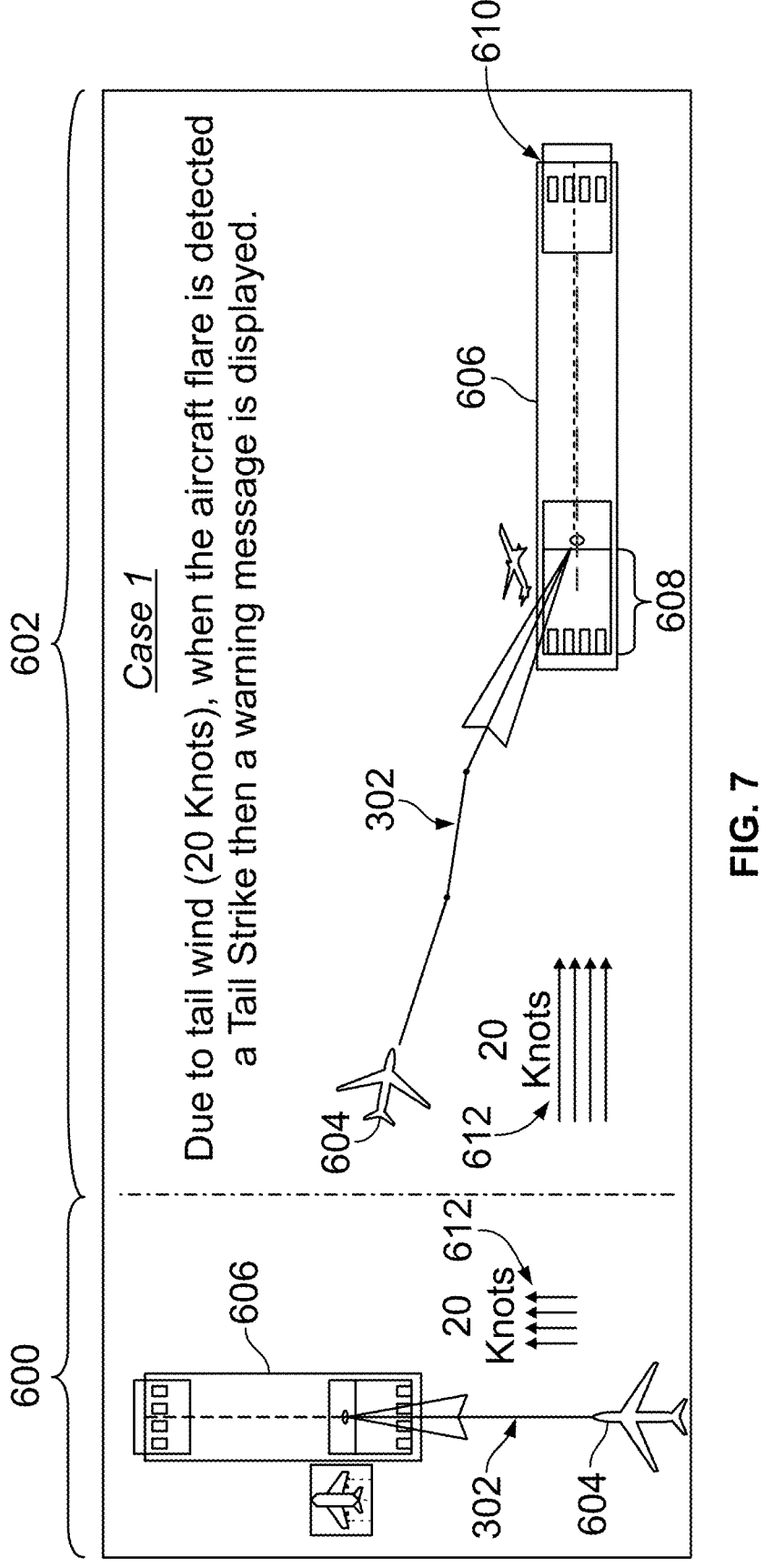
FIG. 7 schematically illustrates one example of a top view and a perspective view of an aircraft approaching a runway for landing with a tailwind.

FIGS. 7 through 14 illustrate examples of different use cases of operation of the aircraft tail strike detection and prevention system shown in FIG. 1 and the methods 200, 1500 shown in FIGS. 2 and 3. FIG. 7 schematically illustrates one example of a top view 600 and a perspective view 602 of an aircraft 604 approaching a runway 606 for landing with a tailwind 612. A touchdown envelope 608 represents an area in which the aircraft 604 is to first touch down on the runway 606 to have sufficient distance to stop before reaching a far end 610 of the runway (representing an area in which the aircraft 604 is to stop movement before taxiing).

The control unit 102 (shown in FIG. 1) can determine that there is a tailwind 612 (of twenty knots in the illustrated example). The control unit 102 can determine that if the aircraft 604 continues on the current descent trajectory 306, then the tailwind 612 is likely to push the aircraft 604 to touchdown at a location 614 that is outside of the touchdown envelope 608. The control unit 102 also can determine that this indicates that a tail strike will occur or is more likely to occur due to touching down outside the envelope 608. As described above, the control unit 102 may notify the pilot and identify an alternate, calculated descent trajectory that avoids the tail strike.

Figure 8:
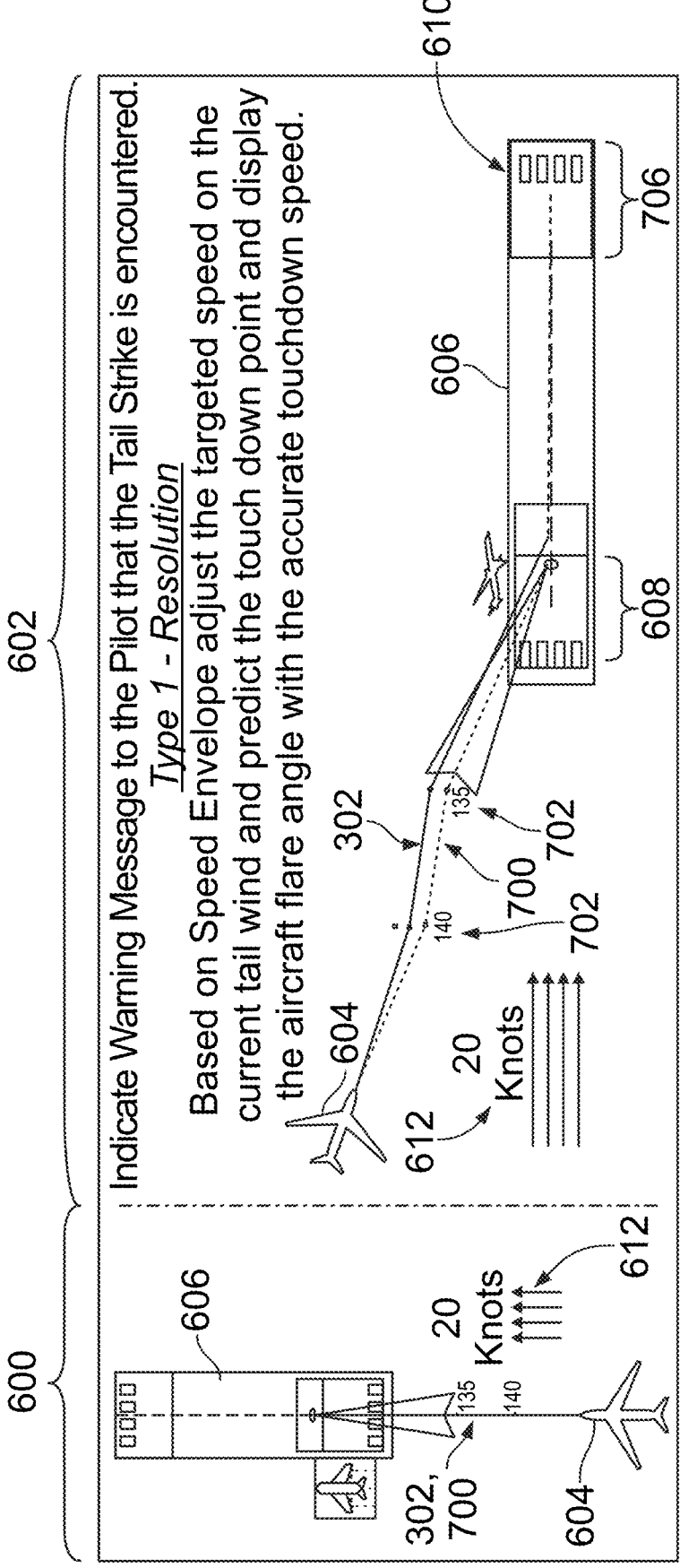
FIG. 8 schematically illustrates the top view and the perspective view of the aircraft shown in FIG. 7 with the tailwind according to another example.

FIG. 8 schematically illustrates the top view 600 and the perspective view 602 of the aircraft 604 shown in FIG. 6 with the tailwind 612 according to another example. In response to determining that a tail strike is likely (e.g., due to the tailwind 612), the control unit 102 (shown in FIG. 1) can alert the pilot and calculate another descent trajectory 700 for the aircraft 604 to follow. This calculated descent trajectory 700 may include a different (e.g., slower) targeted speed of the aircraft 604, may designate calculated speeds 702 of the aircraft 604, and/or may designated certain flare angles at different locations along the calculated descent trajectory 700. The pilot may then control the aircraft 604 or the FCS 116 may automatically control the aircraft 604 to follow the calculated descent trajectory 700 by adjusting (e.g., reducing) the target speed of the aircraft 604 and changing the speed of the aircraft 604 to the calculated speeds 702 at the associated locations. This can result in the aircraft 604 touching down in a location 704 that is within the touchdown envelope 608 without a tail strike, and the aircraft 604 being able to stop movement before taxiing within a stopping envelope 706 that is on the runway 606 (and not beyond the end 610 of the runway 606).

Figure 9:
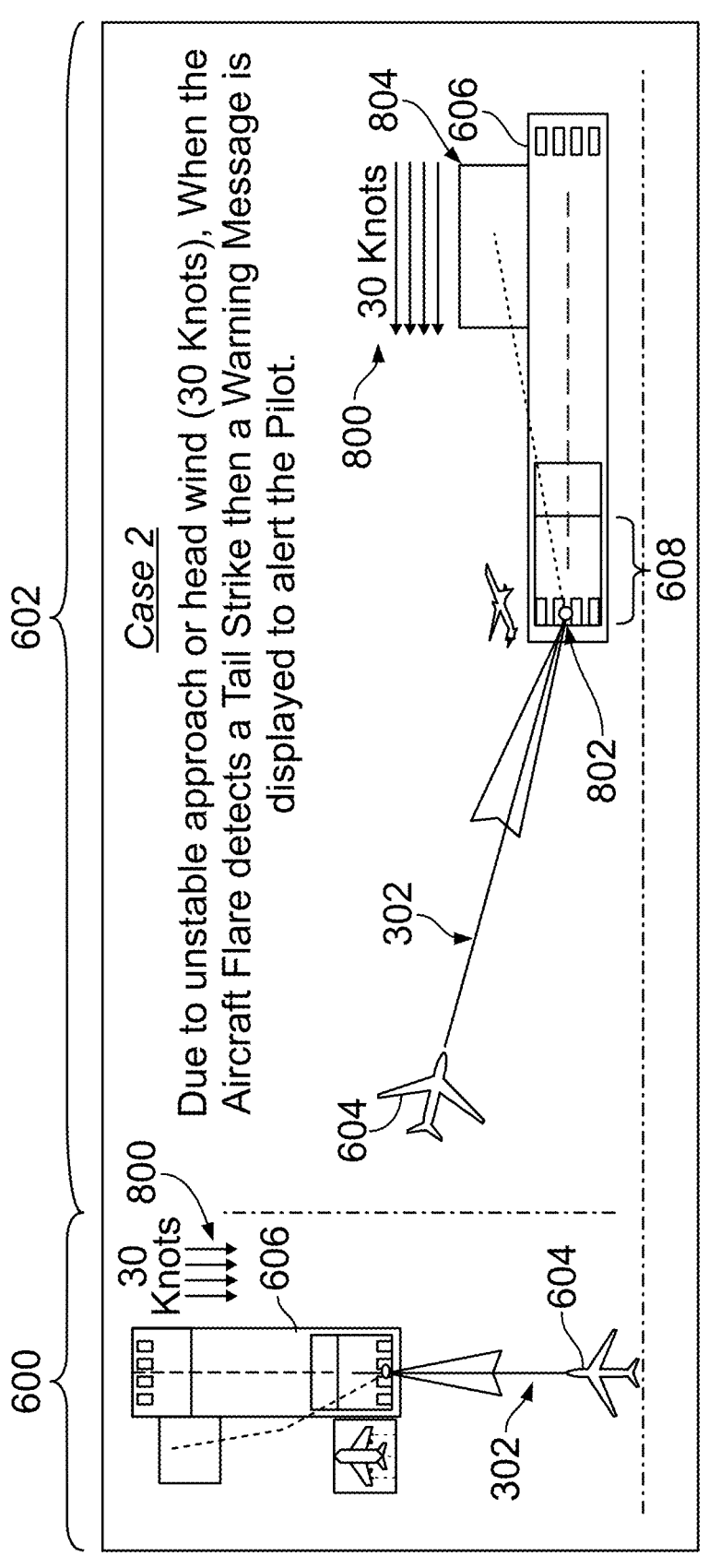
FIG. 9 schematically illustrates another example of the top view and the perspective view of the aircraft approaching the runway for landing during an unstable approach and/or with a headwind.

FIG. 9 schematically illustrates another example of the top view 600 and the perspective view 602 of the aircraft 604 approaching the runway 606 for landing during an unstable approach and/or with a headwind 800. The control unit 102 (shown in FIG. 1) can determine that there is the headwind 800 (of thirty knots in the illustrated example). Optionally, the control unit 102 may determine that the aircraft 604 is otherwise on an unstable approach, such as a path that deviates from the current descent trajectory so that the aircraft 604 is prevented from landing on the runway 606, as shown in FIG. 8. The control unit 102 can determine that if the aircraft 604 continues on the current descent trajectory 306, then the headwind 800 or unstable approach is likely to force the aircraft 604 to touchdown at a location 802 that is within the touchdown envelope 608, but that causes the aircraft 604 to bounce or otherwise have momentum carry the aircraft 604 to stop in an area 804 that is off the runway 606. The control unit 102 also can determine that this indicates that a tail strike will occur or is more likely to occur due to the headwind 800 and/or unstable approach. As described above, the control unit 102 may notify the pilot and identify an alternate, calculated descent trajectory that avoids the tail strike.

Figure 10:
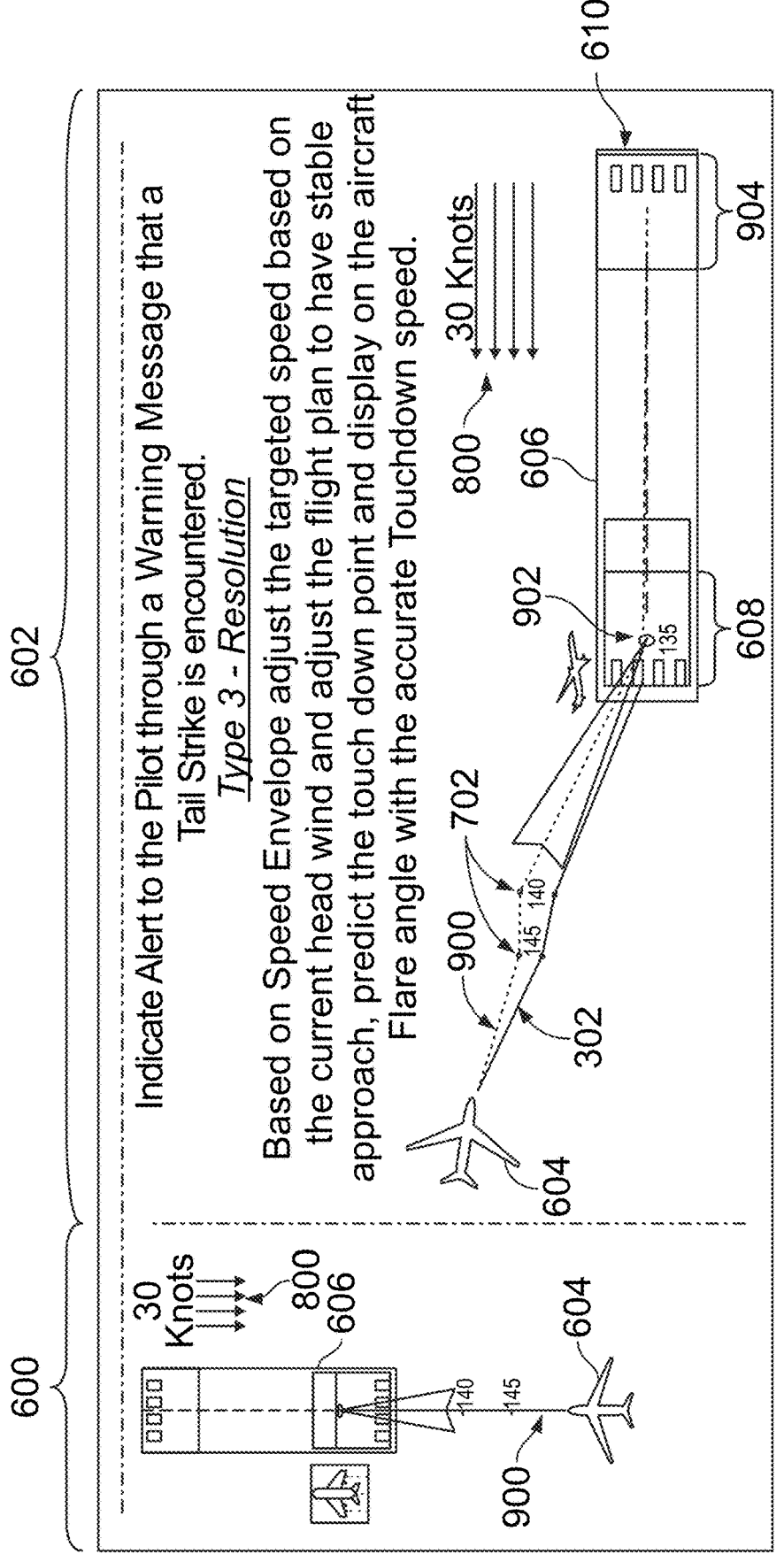
FIG. 10 schematically illustrates the top view and the perspective view of the aircraft shown in FIG. 7 during the unstable approach and/or headwind according to another example.

FIG. 10 schematically illustrates the top view 600 and the perspective view 602 of the aircraft 604 shown in FIG. 7 during the unstable approach and/or headwind 800 according to another example. In response to determining that a tail strike is likely (e.g., due to the headwind 800 and/or unstable approach), the control unit 102 (shown in FIG. 1) can alert the pilot and calculate a different descent trajectory 900 for the aircraft 604 to follow. This calculated descent trajectory 900 may include a different (e.g., faster) targeted speed 702 of the aircraft 604 and/or may designate certain flare angles of the aircraft 604 at different locations along the calculated descent trajectory 900. The pilot may then control the aircraft 604 or the FCS 116 may automatically control the aircraft 604 to follow the calculated descent trajectory 900 by adjusting the target speed of the aircraft 604 and changing the flare angle of the aircraft 604 to match those in the calculated descent trajectory 900. This can result in the aircraft 604 touching down in a location 902 that is within the touchdown envelope 608 without a tail strike, and the aircraft 604 being able to stop movement on the runway 606 within a stopping area or envelope 904 that is on the runway 606 and prior to reaching the end 610 of the runway 606.

Figure 11:
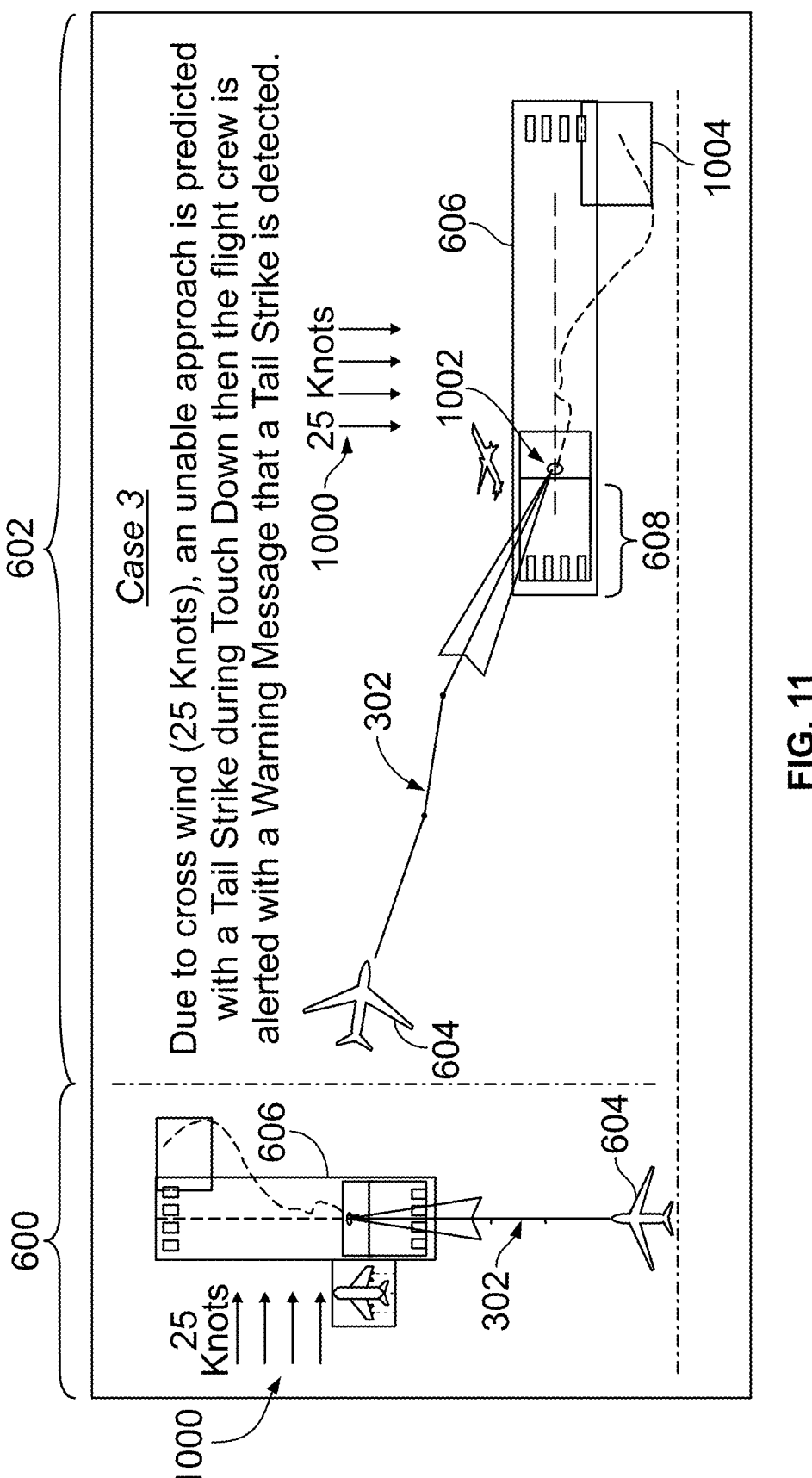
FIG. 11 schematically illustrates another example of the top view and the perspective view of the aircraft approaching the runway for landing during an unstable approach and/or with a crosswind.

FIG. 11 schematically illustrates another example of the top view 600 and the perspective view 602 of the aircraft 604 approaching the runway 606 for landing during an unstable approach and/or with a crosswind 1000. The control unit 102 (shown in FIG. 1) can determine that there is the crosswind 1000 (a wind direction that is transverse to the path of the aircraft 604 and/or the length of the runway 606 of twenty-five knots in the illustrated example). Optionally, the control unit 102 may determine that the aircraft 604 is otherwise on an unstable approach, such as a path that deviates from the current descent trajectory so that the aircraft 604 is prevented from stopping on the runway 606, as shown in FIG. 10.

The control unit 102 can determine that if the aircraft 604 continues on the current descent trajectory 306, then the crosswind 1000 or unstable approach is likely to force the aircraft 604 to touchdown at a location 1002 that is outside the touchdown envelope 608 and that causes the aircraft 604 to bounce or otherwise have momentum carry the aircraft 604 to stop in an area 1004 that is off the runway 606. The control unit 102 also can determine that this indicates that a tail strike will occur or is more likely to occur due to the crosswind 1000 and/or unstable approach. As described above, the control unit 102 may notify the pilot and identify an alternate, calculated descent trajectory that avoids the tail strike.

Figure 12:
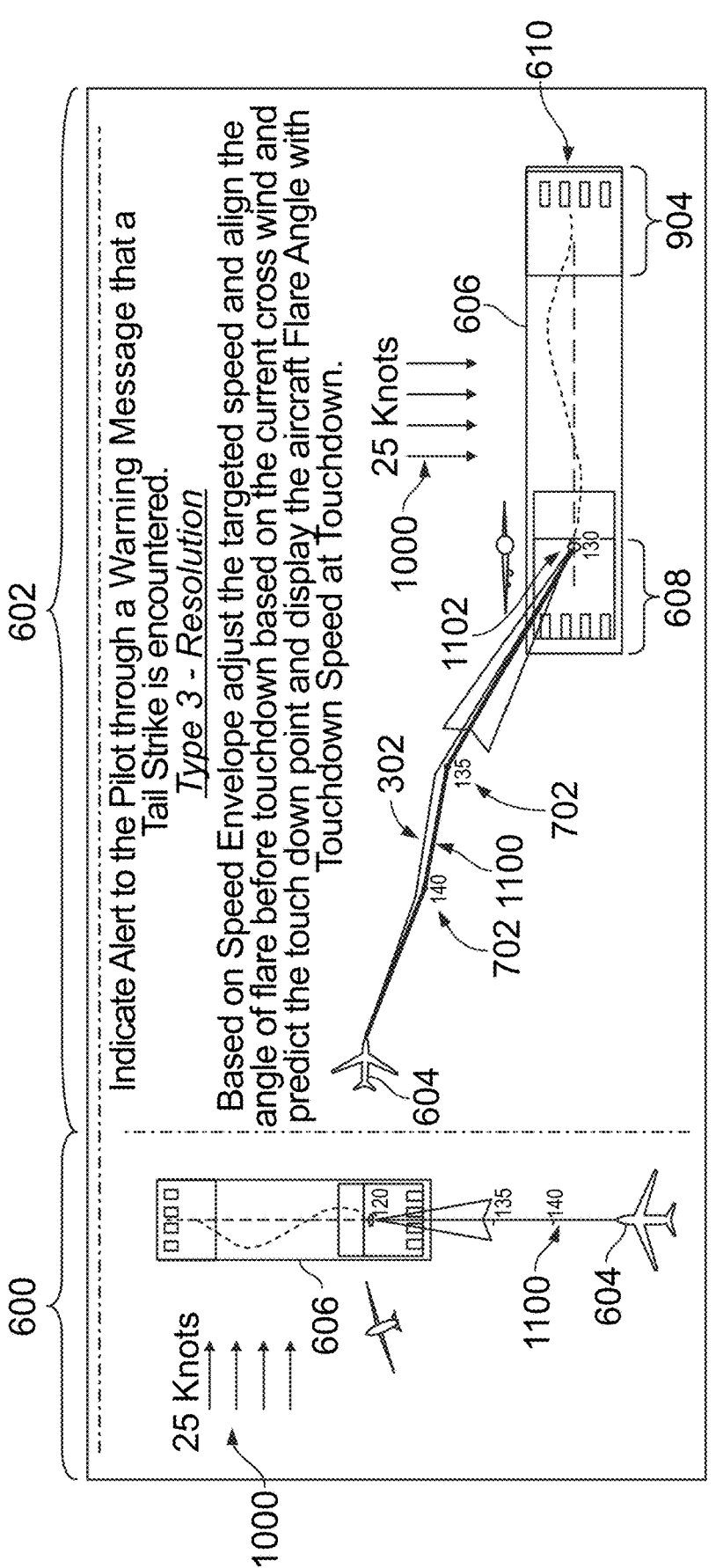
FIG. 12 schematically illustrates the top view and the perspective view of the aircraft shown in FIG. 7 approaching the runway with an unstable approach and/or the crosswind 1000 according to another example.

FIG. 12 schematically illustrates the top view 600 and the perspective view 602 of the aircraft 604 shown in FIG. 7 approaching the runway 606 with an unstable approach and/or the crosswind 1000 according to another example. In response to determining that a tail strike is likely (e.g., due to the crosswind 1000 and/or unstable approach), the control unit 102 (shown in FIG. 1) can alert the pilot and calculate a different descent trajectory 1100 for the aircraft 604 to follow. This calculated descent trajectory 1100 may include a different targeted speed 702 of the aircraft 604 and/or may designate certain flare angles of the aircraft 604 at different locations along the calculated descent trajectory 1100. The pilot may then control the aircraft 604 or the FCS 116 may automatically control the aircraft 604 to follow the calculated descent trajectory 1100 by adjusting the target speed of the aircraft 604 and changing the flare angle of the aircraft

604 to match those in the calculated descent trajectory 1100. This can result in the aircraft 604 touching down in a location 1102 that is within the touchdown envelope 608 without a tail strike, and the aircraft 604 being able to stop movement on the runway 606 within the stopping area or envelope 904 that is on the runway 606 and prior to reaching the end 610 of the runway 606.

Figure 13:
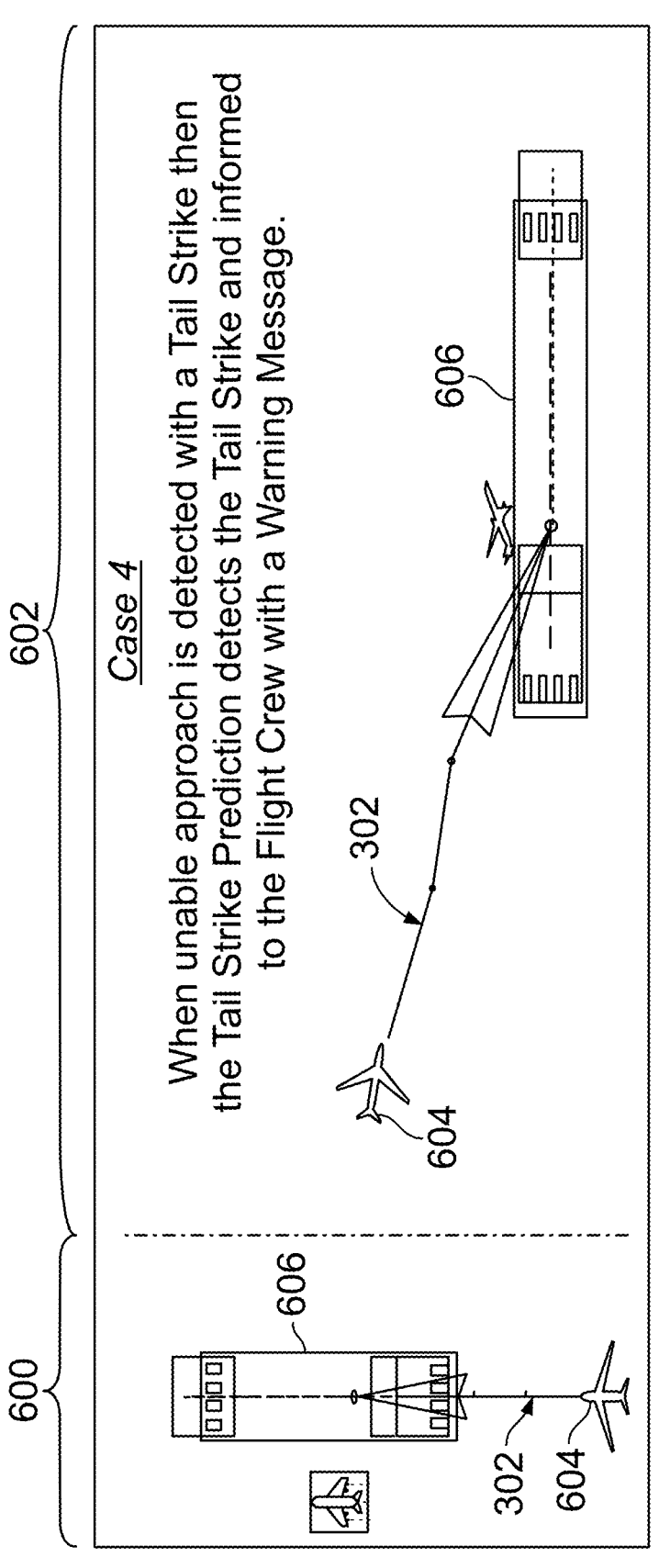
FIG. 13 schematically illustrates another example of the top view and the perspective view of the aircraft approaching the runway for landing during an unstable approach.

FIG. 13 schematically illustrates another example of the top view 600 and the perspective view 602 of the aircraft 604 approaching the runway 606 for landing during an unstable approach. The control unit 102 (shown in FIG. 1) can determine that the current descent trajectory 306 of the aircraft 604 will result in a tail strike. The control unit 102 may notify the pilot and attempt to identify an alternate, calculated descent trajectory that avoids the tail strike. In this example, the control unit 102 is unable to identify another descent trajectory that will allow the aircraft 604 to land without a tail strike.

Figure 14:
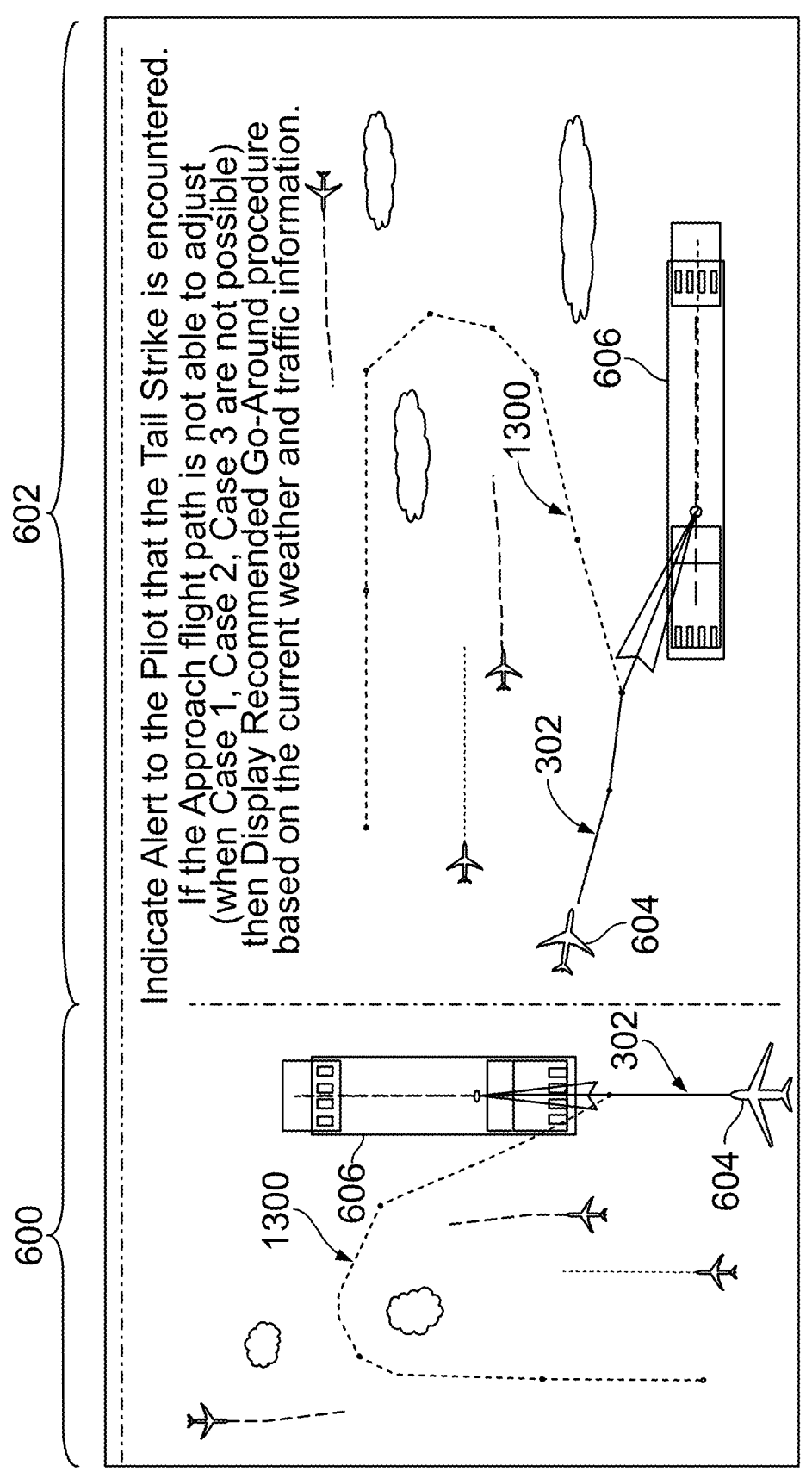
FIG. 14 schematically illustrates the top view and the perspective view of the aircraft shown in FIG. 7 approaching the runway with the unstable approach according to another example.

FIG. 14 schematically illustrates the top view 600 and the perspective view 602 of the aircraft 604 shown in FIG. 7 approaching the runway 606 with the unstable approach according to another example. In response to determining that a tail strike is likely while the aircraft 604 follows the current descent trajectory 306, the control unit 102 may attempt to identify another descent trajectory that prevents a tail strike. In this example, the control unit 102 is unable to identify any such descent trajectory. The control unit 102 can notify the pilot and instruct the pilot to fly the aircraft 604 in a go-around procedure or path 1300 (or the FCS 116 to automatically control the aircraft 604 in the go-around procedure 1300). This can involve the aircraft 604 circling back and attempting the descent and landing again, with the control unit 102 again monitoring characteristics, determining whether a tail strike is likely, and optionally warning the pilot and/or modifying the descent trajectory to avoid the tail strike.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 15 illustrates a perspective front view of the aircraft 604 according to one example. The aircraft 604 includes a propulsion system 1400 that includes engines 1402, for example. Optionally, the propulsion system 1400 may include more engines 1402 than shown. The engines 1402 are carried by wings 1404 of the aircraft 604. In other examples, the engines 1402 may be carried by a fuselage 1406 and/or an empennage 1408. The empennage 1408 may also support horizontal stabilizers 1410 and a vertical stabilizer 1412. The horizontal stabilizers 1410 may include elevators on or at the trailing edges of the horizontal stabilizers 1410. These elevators can rotate up and/or down to control the pitch angle or flare angle of the aircraft 604 during a flare maneuver. The fuselage 1406 of the aircraft 604 defines an internal cabin 1414, which includes a flight deck or cockpit, one or more work sections (for example, galleys, personnel carry-on baggage areas, and the like), one or more passenger sections (for example, first class, business class, and coach sections), one or more lavatories, and/or the like. The aircraft 604 can be sized, shaped, and configured differently than shown in FIG. 14. The pilot or other operators described herein may be onboard the aircraft or may be off-board the aircraft and remotely monitoring and/or controlling the aircraft.

Further, the disclosure comprises examples according to the following clauses:

Clause 1. An aircraft tail strike detection and prevention system comprising: one or more processors configured to obtain one or more aircraft characteristics representative of an aircraft flying toward a landing location and one or more external characteristics representative of one or more conditions outside of the aircraft, the one or more processors configured to obtain a current descent trajectory that the aircraft is to follow to land at the landing location and calculate a probability that the aircraft will experience a tail strike upon touchdown based on the one or more aircraft characteristics and the one or more external characteristics, the one or more processors configured to alert a pilot of the aircraft that the aircraft will experience the tail strike upon touchdown based on the probability.

Clause 2. The aircraft tail strike detection and prevention system of Clause 1, wherein the one or more processors are configured to calculate a calculated descent trajectory that differs from the current descent trajectory and that reduces or eliminates the probability that the aircraft will experience the tail strike upon touchdown.

Clause 3. The aircraft tail strike detection and prevention system of Clause 2, wherein the one or more processors are configured to calculate the calculated descent trajectory by changing one or more flare angles of the aircraft from the current descent trajectory at one or more different locations during descent of the aircraft toward the landing location.

Clause 4. The aircraft tail strike detection and prevention system of Clause 2, wherein the one or more processors are configured to automatically control the aircraft during descent to the landing location according to the calculated descent trajectory.

Clause 5. The aircraft tail strike detection and prevention system of Clause 2, wherein the one or more processors are configured to calculate a go-around procedure for the aircraft to circle back and make another attempt at landing at the landing location responsive to the probability of the calculated descent trajectory resulting in the tail strike being larger than a threshold probability.

Clause 6. The aircraft tail strike detection and prevention system of Clause 2, wherein the one or more processors are configured to calculate the calculated descent trajectory based on one or more of an altitude of the aircraft, a vertical approach speed of the aircraft, a pitch rate of the aircraft, a pitch attitude of the aircraft, an engine thrust of the aircraft, a flight path angle of the aircraft, a stall speed of the aircraft, an angle of attach of the aircraft, a sink rate of the aircraft, a glide slope of the aircraft, a landing weight of the aircraft, or a flare angle of the aircraft.

Clause 7. The aircraft tail strike detection and prevention system of Clause 1, wherein the one or more aircraft characteristics include one or more of aircraft gross weight, a landing weight, an amount or weight of fuel onboard the aircraft, a pitch angle or flare angle of the aircraft, or positions of flaps of the aircraft.

Clause 8. The aircraft tail strike detection and prevention system of Clause 1, wherein the one or more external characteristics include one or more of a weather condition or a runway condition.

Clause 9. The aircraft tail strike detection and prevention system of Clause 1, wherein the one or more processors are configured to obtain the one or more aircraft characteristics and the one or more external characteristics, obtain the current descent trajectory, calculate the probability that the aircraft will experience the tail strike upon touchdown, and alert the pilot of the aircraft that the aircraft will experience the tail strike upon touchdown prior to the aircraft reaching an initial approach fix of landing of the aircraft.

Clause 10. An aircraft tail strike prevention method comprising: obtaining one or more aircraft characteristics representative of an aircraft flying toward a landing location; obtaining one or more external characteristics representative of one or more conditions outside of the aircraft; obtaining a current descent trajectory that the aircraft is to follow to land at the landing location; calculating a probability that the aircraft will experience a tail strike upon touchdown based on the one or more aircraft characteristics and the one or more external characteristics; and alerting a pilot of the aircraft that the aircraft will experience the tail strike upon touchdown based on the probability.

Clause 11. The aircraft tail strike prevention method of Clause 10, further comprising: calculating a calculated descent trajectory that differs from the current descent trajectory and that reduces or eliminates the probability that the aircraft will experience the tail strike upon touchdown.

Clause 12. The aircraft tail strike prevention method of Clause 11, wherein the calculated descent trajectory is calculated by changing one or more flare angles of the aircraft from the current descent trajectory at one or more different locations during descent of the aircraft toward the landing location.

Clause 13. The aircraft tail strike prevention method of Clause 11, further comprising: automatically controlling the aircraft during descent to the landing location according to the calculated descent trajectory.

Clause 14. The aircraft tail strike prevention method of Clause 11, further comprising: calculating a go-around procedure for the aircraft to circle back and make another attempt at landing at the landing location responsive to the probability of the calculated descent trajectory resulting in the tail strike being larger than a threshold probability.

Clause 15. The aircraft tail strike prevention method of Clause 11, wherein the calculated descent trajectory is calculated based on one or more of an altitude of the aircraft, a vertical approach speed of the aircraft, a pitch rate of the aircraft, a pitch attitude of the aircraft, an engine thrust of the aircraft, a flight path angle of the aircraft, a stall speed of the aircraft, an angle of attach of the aircraft, a sink rate of the aircraft, a glide slope of the aircraft, a landing weight of the aircraft, or a flare angle of the aircraft.

Clause 16. An aircraft tail strike detection and prevention system comprising: a control unit configured to calculate a probability that a tail strike will occur upon touchdown during landing of an aircraft; one or more databases storing one or more of navigation data, obstacle data, engine data, or terrain data; and an output device configured to present an alert to a pilot of the aircraft, the control unit configured to calculate the probability that the tail strike will occur based on a current descent trajectory of the aircraft and based on the one or more of the navigation data, the obstacle data, the engine data, or the terrain data, the control unit configured to direct the output device to present the alert to the pilot responsive to the probability that the tail strike will occur exceeding a threshold probability.

Clause 17. The aircraft tail strike detection and prevention system of Clause 16, wherein the control unit is configured to calculate an alternate descent trajectory having one or more flare angles during descent that differ from the current descent trajectory and that reduces or eliminates the probability that the tail strike will occur upon touchdown during landing of the aircraft.

Clause 18. The aircraft tail strike detection and prevention system of Clause 17, further comprising: a flight control system configured to automatically control the aircraft to change the one or more flare angles according to the alternate descent trajectory during descent of the aircraft.

Clause 19. The aircraft tail strike detection and prevention system of Clause 17, wherein the control unit is configured to calculate a go-around procedure for the aircraft to attempt another landing responsive to the probability that the tail strike will occur upon touchdown during landing of the aircraft using the alternate descent trajectory not decreasing below the threshold probability.

Clause 20. The aircraft tail strike detection and prevention system of Clause 16, wherein the control unit is configured to calculate the probability based on one or more of aircraft gross weight, a landing weight, an amount or weight of fuel onboard the aircraft, a pitch angle or flare angle of the aircraft, positions of flaps of the aircraft, a windspeed and direction, or a runway condition.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft tail strike detection and prevention system comprising:

one or more processors configured to obtain one or more aircraft characteristics representative of an aircraft flying toward a landing location and one or more external characteristics representative of one or more conditions outside of the aircraft, the one or more processors configured to obtain a current descent trajectory that the aircraft is to follow to land at the landing location and calculate a probability that the aircraft will experience a tail strike upon touchdown based on the one or more aircraft characteristics and the one or more external characteristics, the one or more processors configured to alert a pilot of the aircraft that the aircraft will experience the tail strike upon touchdown based on the probability, and the one or more processors configured to instruct the pilot to follow one or more of a speed adjustment, a provisional flight plan, a go-around procedure, and a missed approach procedure calculated responsive to the probability.

2. The aircraft tail strike detection and prevention system of claim 1, wherein the one or more processors are configured to calculate a calculated descent trajectory that differs from the current descent trajectory and that reduces or eliminates the probability that the aircraft will experience the tail strike upon touchdown.

3. The aircraft tail strike detection and prevention system of claim 2, wherein the one or more processors are configured to calculate the calculated descent trajectory by changing one or more flare angles of the aircraft from the current descent trajectory at one or more different locations during descent of the aircraft toward the landing location.

4. The aircraft tail strike detection and prevention system of claim 2, wherein the one or more processors are configured to automatically control the aircraft during descent to the landing location according to the calculated descent trajectory.

5. The aircraft tail strike detection and prevention system of claim 2, wherein the one or more processors are configured to calculate the go-around procedure for the aircraft to circle back and make another attempt at landing at the landing location responsive to the probability of the calculated descent trajectory resulting in the tail strike being larger than a threshold probability.

6. The aircraft tail strike detection and prevention system of claim 2, wherein the one or more processors are configured to calculate the calculated descent trajectory based on one or more of an altitude of the aircraft, a vertical approach speed of the aircraft, a pitch rate of the aircraft, a pitch attitude of the aircraft, an engine thrust of the aircraft, a flight path angle of the aircraft, a stall speed of the aircraft, an angle of attack of the aircraft, a sink rate of the aircraft, a glide slope of the aircraft, a landing weight of the aircraft, or a flare angle of the aircraft.

7. The aircraft tail strike detection and prevention system of claim 1, wherein the one or more aircraft characteristics include one or more of aircraft gross weight, a landing weight, an amount or weight of fuel onboard the aircraft, a pitch angle or flare angle of the aircraft, or positions of flaps of the aircraft.

8. The aircraft tail strike detection and prevention system of claim 1, wherein the one or more external characteristics include one or more of a weather condition or a runway condition.

9. The aircraft tail strike detection and prevention system of claim 1, wherein the one or more processors are configured to obtain the one or more aircraft characteristics and the one or more external characteristics, obtain the current descent trajectory, calculate the probability that the aircraft will experience the tail strike upon touchdown, and alert the pilot of the aircraft that the aircraft will experience the tail strike upon touchdown prior to the aircraft reaching an initial approach fix of landing of the aircraft.

10. An aircraft tail strike prevention method comprising:
obtaining one or more aircraft characteristics representative of an aircraft flying toward a landing location;
obtaining one or more external characteristics representative of one or more conditions outside of the aircraft;
obtaining a current descent trajectory that the aircraft is to follow to land at the landing location;
calculating a probability that the aircraft will experience a tail strike upon touchdown based on the one or more aircraft characteristics and the one or more external characteristics;
alerting a pilot of the aircraft that the aircraft will experience the tail strike upon touchdown based on the probability; and
instructing the pilot to follow one or more of a speed adjustment, provisional flight plan, a go-around procedure, and a missed approach procedure calculated responsive to the probability.

11. The aircraft tail strike prevention method of claim 10, further comprising:
calculating a calculated descent trajectory that differs from the current descent trajectory and that reduces or eliminates the probability that the aircraft will experience the tail strike upon touchdown.

12. The aircraft tail strike prevention method of claim 11, wherein the calculated descent trajectory is calculated by changing one or more flare angles of the aircraft from the current descent trajectory at one or more different locations during descent of the aircraft toward the landing location.

13. The aircraft tail strike prevention method of claim 11, further comprising:
automatically controlling the aircraft during descent to the landing location according to the calculated descent trajectory.

14. The aircraft tail strike prevention method of claim 11, further comprising:
calculating the go-around procedure for the aircraft to circle back and make another attempt at landing at the landing location responsive to the probability of the calculated descent trajectory resulting in the tail strike being larger than a threshold probability.

15. The aircraft tail strike prevention method of claim 11, wherein the calculated descent trajectory is calculated based on one or more of an altitude of the aircraft, a vertical approach speed of the aircraft, a pitch rate of the aircraft, a pitch attitude of the aircraft, an engine thrust of the aircraft, a flight path angle of the aircraft, a stall speed of the aircraft, an angle of attack of the aircraft, a sink rate of the aircraft, a glide slope of the aircraft, a landing weight of the aircraft, or a flare angle of the aircraft.

16. An aircraft tail strike detection and prevention system comprising:
a control unit configured to calculate a probability that a tail strike will occur upon touchdown during landing of an aircraft based on one or more aircraft characteristics representative of the aircraft and one or more external characteristics representative of one or more conditions outside of the aircraft;
one or more databases storing one or more of navigation data, obstacle data, engine data, or terrain data; and
an output device configured to present an alert to a pilot of the aircraft,
the control unit configured to calculate the probability that the tail strike will occur based on a current descent trajectory of the aircraft and based on the one or more of the navigation data, the obstacle data, the engine data, or the terrain data, the control unit configured to direct the output device to present the alert to the pilot responsive to the probability that the tail strike will occur exceeding a threshold probability, and the control unit configured to instruct the pilot to follow one or more of a speed adjustment, provisional flight plan, a go-around procedure, and a missed approach procedure calculated responsive to the probability.

17. The aircraft tail strike detection and prevention system of claim 16, wherein the control unit is configured to calculate an alternate descent trajectory having one or more flare angles during descent that differ from the current descent trajectory and that reduces or eliminates the probability that the tail strike will occur upon touchdown during landing of the aircraft.

18. The aircraft tail strike detection and prevention system of claim 17, further comprising:
a flight control system configured to automatically control the aircraft to change the one or more flare angles according to the alternate descent trajectory during descent of the aircraft.

19. The aircraft tail strike detection and prevention system of claim 16, wherein the control unit is configured to calculate the go-around procedure for the aircraft to attempt another landing responsive to the probability that the tail strike will occur upon touchdown during landing of the aircraft using the alternate descent trajectory not decreasing below the threshold probability.

20. The aircraft tail strike detection and prevention system of claim 16, wherein the control unit is configured to calculate the probability based on one or more of aircraft gross weight, a landing weight, an amount or weight of fuel onboard the aircraft, a pitch angle or flare angle of the aircraft, positions of flaps of the aircraft, a windspeed and direction, or a runway condition.

* * * * *